United States Patent [19]
Hirokane et al.

[11] Patent Number: 5,640,374
[45] Date of Patent: Jun. 17, 1997

[54] MAGNETO-OPTICAL RECORDING MEDIUM HAVING INTERMEDIATE LAYER OF IN-PLANE MAGNETIZATION AND METHOD OF REPRODUCING FROM THE MEDIUM

[75] Inventors: Junji Hirokane, Nara; Michinobu Mieda; Junichiro Nakayama, both of Shiki-gun; Akira Takahashi, Nara, all of Japan

[73] Assignee: Sharp Kabushiki Kaisha, Osaka, Japan

[21] Appl. No.: 659,391

[22] Filed: Jun. 6, 1996

[30] Foreign Application Priority Data

Jun. 8, 1995 [JP] Japan ................................. 7-142275

[51] Int. Cl.$^6$ ..................................... G11B 11/00
[52] U.S. Cl. .................. 369/13; 365/122; 428/694 ML
[58] Field of Search ........................... 369/13, 14, 275.2, 369/110, 275.4, 116; 360/59, 114; 365/122; 428/694 R, 694 ML, 694 MT, 694 MM

[56] References Cited

U.S. PATENT DOCUMENTS

| | | | |
|---|---|---|---|
| 5,016,232 | 5/1991 | Tadokoro et al. | 369/13 |
| 5,018,119 | 5/1991 | Aratani et al. | 369/13 |
| 5,168,482 | 12/1992 | Aratani et al. | 369/13 |
| 5,208,797 | 5/1993 | Nakaki et al. | 369/13 |
| 5,218,581 | 6/1993 | Ohta et al. | 369/13 |
| 5,241,520 | 8/1993 | Ohta et al. | 369/13 |
| 5,283,770 | 2/1994 | Nakao et al. | 369/13 |
| 5,420,728 | 5/1995 | Kawase | 369/13 |

OTHER PUBLICATIONS

Nishimura, et al., "MRS Disks With Three Magnetic Layers Using In-Plane Magnetization Films", *Digest of MORIS*, 1994, 29-K-04, pp. 125. Sep. 27th, 1994.

Tamanoi, et al., "Magnetically-Induced Super Resolution Using Magneto-Static Coupling", *Digest of MORIS*, 1994, 29-K-05, pp. 126. Sep. 27th, 1994.

Miyamoto, et al., "New Readout Technique Using Domain Collapse On Magnetic Multilayer", *Digest of MORIS*, 1994, 29-K-06, pp. 127. Sep. 27th, 1994.

*Primary Examiner*—Tan Dinh
*Attorney, Agent, or Firm*—David G. Conlin; Milton Oliver

[57] ABSTRACT

A recording layer having a recording magnetic domain for recording thereon information is formed. A readout layer for reading the information by the application of a light beam is formed on the recording layer. An intermediate layer made of a film having in-plane magnetization is formed between the recording layer and readout layer to control a magnetic exchange coupling force between the recording layer and readout layer. The readout layer is arranged so that the stable magnetic domain width in the readout layer is larger than that of the recording magnetic domain in the recording layer at room temperature. At a readout temperature achieved by the light beam, the stable magnetic domain width becomes smaller than that of the recording magnetic domain, and the magnetization direction in the recording magnetic domain is copied. Consequently, the information on the recording layer is read only from a section corresponding to a central portion of the light beam through the readout layer by the light beam, and the effect of other magnetic domains adjacent to the magnetic domain to be read in the readout layer can be reduced. It is thus possible to achieve high density recording of information on the recording layer.

17 Claims, 15 Drawing Sheets

FIG.12(a)
FIG.12(b)
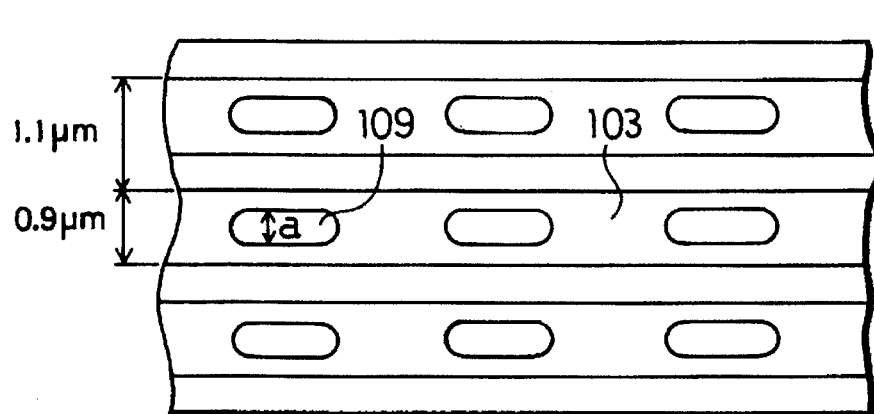
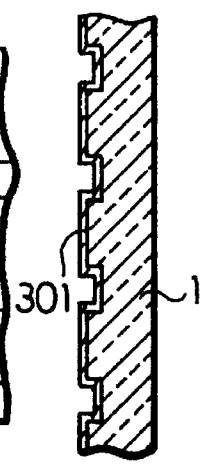
FIG.13
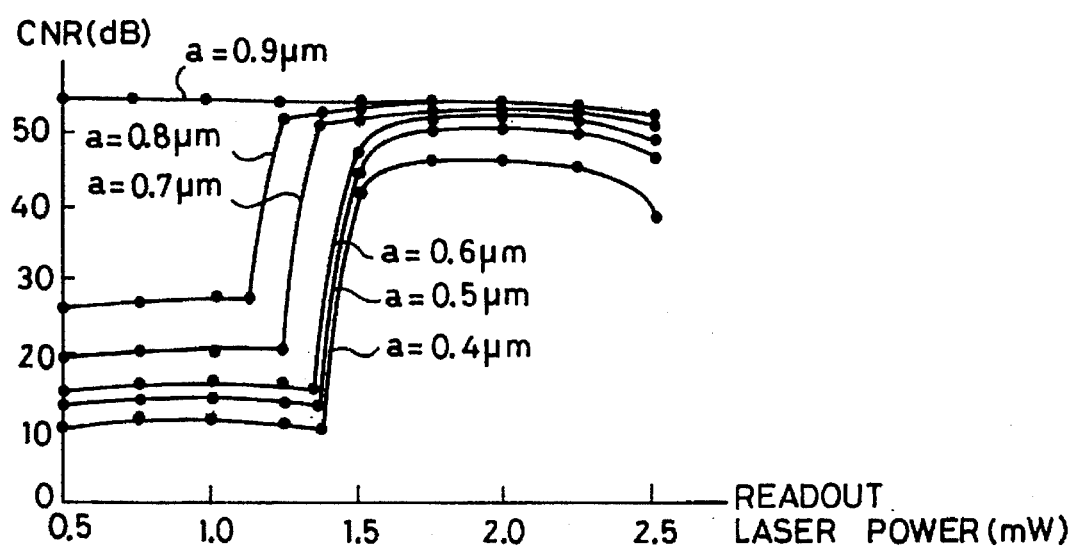

FIG.14(a)
FIG.14(b)
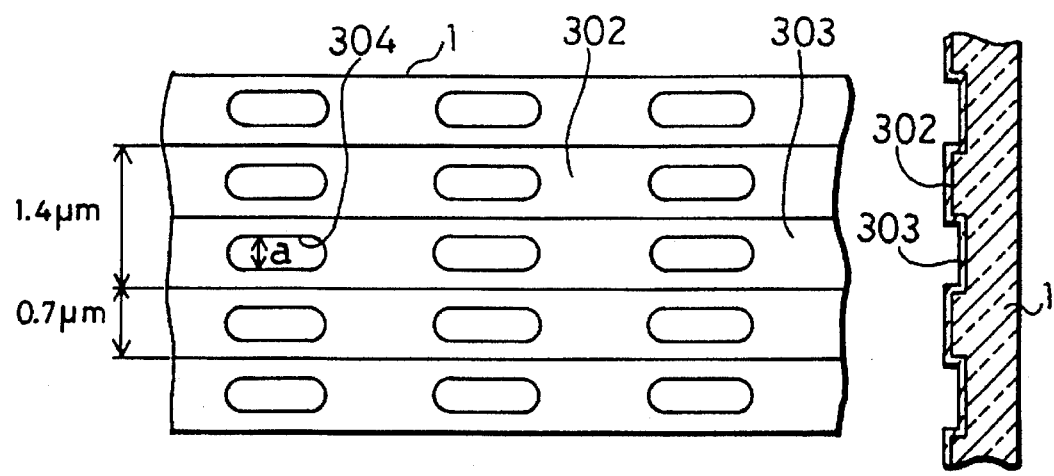
FIG.15
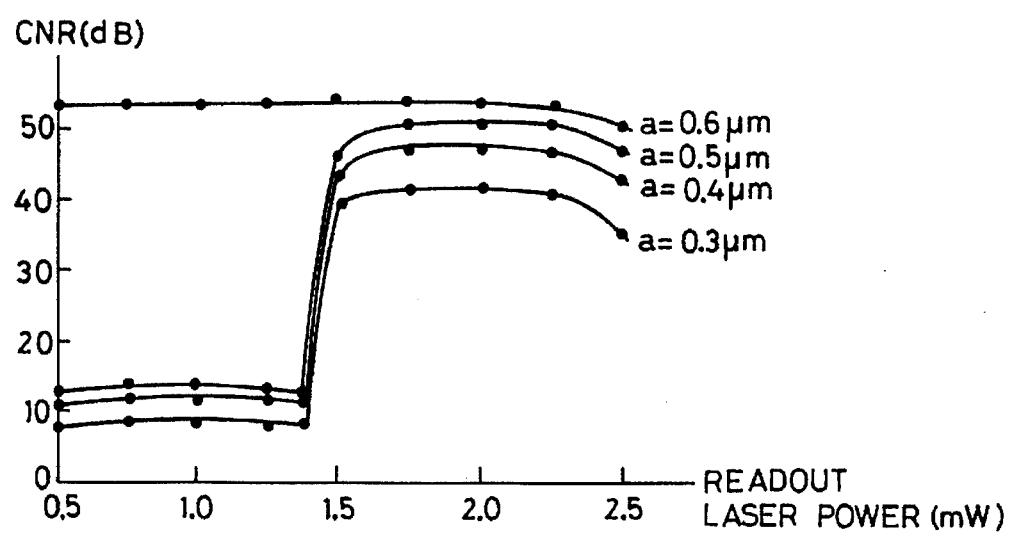

MAGNETO-OPTICAL RECORDING MEDIUM HAVING INTERMEDIATE LAYER OF IN-PLANE MAGNETIZATION AND METHOD OF REPRODUCING FROM THE MEDIUM

FIELD OF THE INVENTION

The present invention relates to a magneto-optical recording medium for use in a magneto-optical recording and readout apparatus, such as a magneto-optical disk, a magneto-optical tape and a magneto-optical card, and a readout method of the same.

BACKGROUND OF THE INVENTION

Conventionally, a magneto-optical disk memory having a film with perpendicular magnetization, which enables a detection of magnetization direction in the film of the perpendicular magnetization by irradiating laser light on the perpendicular magnetization film to reflect and detecting the respective magnetization directions from the reflected light of the laser light varying due to the polar Kerr effect, has been used as a rewritable magneto-optical recording medium in its practical application.

Such a magneto-optical disk memory suffers from a drawback that readout characteristics deteriorate when a recording bit diameter as a recording magnetic domain and an interval between the recording bits become smaller with respect to a diameter of a light beam of a semiconductor laser converged on the magneto-optical memory.

Such a problem is caused by the following reason. When the laser light is focused on a target recording bit, the adjoining recording bits also fall within the diameter of beam spot, and therefore each recording bit can not be read separately.

In order to solve the above-mentioned problem, Japanese Laid-Open Patent Publication No. 81717/1993 (Tokukaihei 5-81717) discloses a super resolution magneto-optical readout technique. More concretely, as shown in FIG. 22(a) and 22(b), a track 203 is provided in a spiral form or concentric form on a disk-like substrate 200, and a recording bit 201 having a readout layer 3' and a recording layer 4' is formed at a predetermined interval along each track 203.

In this state, laser light 205 is projected onto the readout layer 3'. On a spot 206 on which the laser light 205 is irradiated, the readout layer 3' and the recording layer 4' show temperature distributions corresponding to a light intensity distribution in the direction of a diameter of the laser light 205. Here, the readout layer 3' has an in-plane magnetization at room temperature, and has a perpendicular magnetization in response to a temperature rise.

The polar Kerr effect used as readout means for the magneto-optical recording medium is obtained only from a perpendicular magnetization component of the readout layer 3' whereon the laser light 205 is projected. Therefore, perpendicular magnetization is shown only in the area irradiated with the laser light 205, i.e., the central portion having a temperature rise in the laser beam spot 206 on the readout layer 3', thereby obtaining a readout signal from the readout layer 3'.

As a result, only the magnetization state of the recording layer 4' of the recording bit 201 that is present in the central portion of spot 206 of the laser light 205 is copied to the readout layer 3' by the exchange coupling. While other recording bits 202 of the readout layer 3' show in-plane magnetization, thereby allowing only information on the recording bit 201 to be readout.

For the above-mentioned reason, even if the diameter of each recording bit 201, 202 or the interval between the recording bits 201 and 202 is made smaller than the diameter of the spot 206 of the laser light 205, the recording bits 201 and 202 can be readout respectively, thereby achieving high-density recording of information to be readout.

However, in the conventional arrangement disclosed in the above publication, a further improvement of the recording density of respective recording bits 201 and 202 is restricted by the problem associated with a readout operation.

More specifically, with the prior art, the readout layer 3' generally shows a gradual change from in-plane magnetization to perpendicular magnetization as the temperature increases. Here, since the temperature of recording bit 202 adjoining to the recording bit 201 to be readout is also raised to a degree, the magnetization in the readout layer 3' in the adjoining recording bit 202 faces an intermediate direction in the course of the change from the in-plane magnetization to the perpendicular magnetization, thereby having a component in the perpendicular magnetization direction.

Thus, when reading information recorded on the recording bit 201, the perpendicular magnetization component of the adjoining recording bit 202 is also read by the laser light 205. Consequently, each recording bit 201 cannot be readout by being completely separated from the signal of the recording bit 202.

Accordingly, there is a limitation in terms of reducing the size of the recording bits 201 and 202 and the interval between the recording bits 201 and 202 associated with the readout operation. It is therefore difficult to further improve the recording density of the recording bits 201 and 202.

SUMMARY OF THE INVENTION

An object of the present invention is to provide a magneto-optical recording medium capable of achieving an improved recording density of information compared with conventional magneto-optical recording media.

Another object of the present invention is to provide a method for reading information from a magneto-optical recording medium which permits more stable readout of information recorded at high-density based on a magnetization direction than conventional methods.

In order to achieve the above object, the first magneto-optical recording medium in accordance with the present invention is characterized by including:

a recording layer composed of a magnetic film with perpendicular magnetization, having a recording magnetic domain for recording thereon information by a perpendicular magnetization direction;

a readout layer composed of a magnetic film with perpendicular magnetization, having a readout magnetic domain to which a magnetization direction is copied from the recording magnetic domain, wherein a width of a stable magnetic domain which can exists in the readout magnetic domain in a stable manner is larger than a width of the recording magnetic domain at room temperature and smaller than the width of the recording magnetic domain at an elevated predetermined temperature above room temperature, said readout layer being formed on said recording layer; and an intermediate layer composed of a film having in-plane magnetization, arranged between the recording layer and the readout layer, for controlling a magnetic exchange coupling force between the recording layer and the readout layer so that the magnetization direction is not copied at a portion where the laser light for detecting the magnetization direction in the readout magnetic domain is not projected.

According to the described arrangement, at room temperature, since the stable magnetic domain width in the readout magnetic domain is larger than the width of the recording magnetic domain, the readout magnetic domain does not exist within the width of the recording magnetic domain. Moreover, by the intermediate layer made of the film having in-plane magnetization, the magnetic exchange coupling force between the readout layer and the recording layer is controlled to be smaller.

Therefore, even if the coercive force of the readout layer is set small with respect to the recording layer so that the stable magnetic domain width in the readout layer becomes larger than the width of the recording magnetic domain at room temperature, it is possible to prevent the magnetization direction in the readout layer from being aligned with the magnetization direction in the recording magnetic domain.

On the other hand, when a temperature increase is caused on the recording layer, the intermediate layer and the readout layer by the application of laser light during readout, the readout layer is set so that the stable magnetic domain width in the readout magnetic domain in the readout layer is equal to or smaller than the width of the recording magnetic domain. When the width of the stable magnetic domain in the readout magnetic domain becomes closer to the width of the recording magnetic domain with an increase in the temperature, the magnetization direction in the recording magnetic domain is copied to the readout magnetic domain by the magnetostatic coupling force caused by a leakage magnetic flux in the recording magnetic domain and the controlled magnetic exchange coupling force.

Here, the portion of the readout layer irradiated with the laser light shows such a temperature distribution that the temperature becomes higher from the peripheral portion towards the central portion. This enables the readout layer has such a characteristic that the stable magnetic domain width is smaller than the width of the recording magnetic domain only at the central portion. As a result, information recorded on the recording layer can be readout through the readout layer by the laser light only from the central portion.

Additionally, in the above arrangement, with the use of the laser light, when detecting the magnetization direction in the readout magnetic domain to which the magnetization direction in the recording magnetic domain is copied by a temperature increase caused by the laser light, it is possible to prevent the effect of the magnetization direction in other readout magnetic domains which are adjacent to the above-mentioned readout magnetic domain and irradiated with the laser light.

Namely, in the described arrangement, the readout layer is arranged such that when the temperature is raised by the laser light for detecting the magnetization direction of the readout magnetic domain during readout, the stable magnetic domain width varies and becomes equal to or smaller than the width of the recording magnetic domain. It is therefore possible to decrease a coercive force of other readout magnetic domains that are different from the readout magnetic domain whose temperature is raised by the laser light to a point where the stable magnetic domain width becomes equal to or smaller than the width of the recording magnetic domain. In addition, the intermediate layer reduces the magnetic exchange coupling force between the recording layer and the readout layer. As a result, the direction of magnetization in the other readout magnetic domains can be easily aligned with one of the magnetization directions, i.e., the first magnetization direction, for example, by the external magnetic field.

Consequently, in the described arrangement, only in the readout magnetic domain corresponding to the recording magnetic domain having the second magnetization direction different from the first magnetization direction, the magnetization direction is aligned with the second magnetization direction by the projection of the laser light. On the other hand, the magnetization direction in the other readout magnetic domains adjoining to the readout magnetic domain can be maintained in the first magnetization direction. It is thus possible to prevent the magnetization direction in the other readout magnetic domains from affecting the readout signal during readout.

Accordingly, in the above-mentioned arrangement, since the effect of the magnetization direction in the other readout magnetic domains adjacent to the magnetic domain to be readout is prevented, even if the size and the intervals of the respective recording magnetic domains in the recording layer are made smaller than those of a conventional magneto-optical recording medium, it is possible to readout information on the respective recording magnetic domains with accuracy, thereby improving the recording density of information on the recording layer.

A second magneto-optical recording medium of the present invention is based on the first magneto-optical recording medium, and is characterized in that when the temperature of the readout magnetic domain is raised and the stable magnetic domain width in the readout magnetic domain becomes identical with the width of the recording magnetic domain, the magnetization direction in the recording magnetic domain is copied to the readout magnetic domain facing the recording magnetic domain by the magnetostatic coupling force and the exchange coupling force.

In this arrangement, in the process of raising the temperature of the readout magnetic domain by the laser light, when the stable magnetic domain width becomes identical with the width of the recording magnetic domain, the magnetization direction in the recording magnetic domain is copied to the readout magnetic domain by the magnetostatic coupling force caused by a leakage magnetic flux in the recording magnetic domain and the magnetic exchange coupling force controlled by the intermediate layer, and the copied magnetization direction is detected by the laser light. As a result, the readout signal to be detected shows a sharp rise, and the position of the recording magnetic domain is detected more accurately, thereby improving the quality of the readout signal.

A third magneto-optical recording medium of the present invention is based on the first magneto-optical recording medium, and is characterized in that the recording layer includes the first recording magnetic domain and the second recording magnetic domain respectively having perpendicular magnetization in anti-parallel directions, wherein the width of the first recording magnetic domain is larger than the width of the second recording magnetic domain, and the readout layer has the stable magnetic domain having a width as small as that of the second recording magnetic domain when the temperature rises.

According to this arrangement, since the stable magnetic domain width in the readout layer is set substantially as small as the width of the second recording magnetic domain when the temperature rises, the magnetization direction in the second recording magnetic domain in the recording layer can be detected through the readout magnetic domain corresponding to the second recording magnetic domain based on the temperature increase caused by the laser light.

Additionally, since the width of the first recording magnetic domain is set larger than the width of the second recording magnetic domain, at room temperature, the stable magnetic domain width in the readout layer is made smaller than the width of the first recording magnetic domain and the first readout magnetic domain as a readout magnetic domain corresponding to the first recording magnetic domain can be aligned with the magnetization direction in the first recording magnetic domain by the leakage magnetic flux.

On the other hand, in the second readout magnetic domain as the readout magnetic domain corresponding to the second recording magnetic domain, it is possible to reduce the effect of the magnetization direction in the second recording magnetic domain on the magnetization direction in the other second readout magnetic domains which are different from the second readout magnetic domain to which the magnetization direction in the second recording magnetic domain is copied due to the substantially same magnetic domain width resulting from a temperature rise caused by the laser light. This is achieved by providing the intermediate layer between the recording layer and the readout layer so as to decrease the exchange coupling force between the recording layer and the readout layer. As a result, the magnetization direction in the second readout magnetic domain can be aligned with the first readout magnetic domain which is aligned with the magnetization direction in the first recording magnetic domain by the exchange coupling force in the readout layer.

In this arrangement, the magnetization direction of the readout magnetic domains other than the readout magnetic domain irradiated with the center portion of the laser light can be aligned with the magnetization direction of the first recording magnetic domain having a wider magnetic domain width by the magnetostatic coupling force due to the leakage magnetic flux generated from the recording layer and the magnetic exchange coupling force controlled by the intermediate layer. It is thus possible to omit the external magnetic field for aligning the magnetization direction in the other readout magnetic domains in the magnetization direction in the first recording magnetic domain.

Moreover, the first readout method for reading information from the magneto-optical recording medium includes the steps of:

aligning directions of perpendicular magnetization in the readout layer in one direction beforehand by an external magnetic field;

projecting laser light onto the readout layer whose perpendicular magnetization has been aligned in one direction by the external magnetic field so as to raise the temperature of the readout layer until a stable magnetic domain width of the readout magnetic domain becomes equal to or smaller than the width of the recording magnetic domain, copying the magnetization direction in the recording magnetic domain to the readout magnetic domain whose temperature has been raised to a point where the stable magnetic domain width in the readout magnetic domain is equal to or smaller than the width of the recording magnetic domain by the laser light; and detecting a readout signal for readout information from the readout magnetic domain by the laser light.

In this method, by aligning the magnetization direction in the readout magnetic domain in the readout layer in one direction beforehand, when the magnetization direction in the readout magnetic domain corresponding to the recording magnetic domain is copied from the recording magnetic domain as the temperature is increased by the laser light, the effect of the magnetization direction in other readout magnetic domains adjacent to this readout magnetic domain can be reduced.

Therefore, this method achieves a more stable detection of the copied magnetization than a conventional method. It is thus possible to readout information recorded in the recording magnetic domain in the recording layer based on the magnetization direction at a higher density than a conventional arrangement.

The second readout method for readout information from the magneto-optical recording medium is characterized in that, in the step of aligning the perpendicular magnetization direction of the readout layer in one direction beforehand, an external magnetic field is disposed to face one surface of the magneto-optical recording medium opposite to other surface onto which the laser light is projected so as to align the magnetization direction in the other readout magnetic domains, which are different from the readout magnetic domain to which the magnetization direction is copied from the recording magnetic domain as the temperature is increased by the laser light, by the external magnetic field.

In this method, since the external magnetic field is disposed on the surface opposite to the surface irradiated with the laser light, it is possible to align all the magnetization directions in the other readout magnetic domains, which are adjacent to the readout magnetic domain where the magnetization direction is copied from the recording magnetic domain as the temperature is increased by the laser light and correspond to the periphery portion of the portion irradiated with the laser light, in one direction. It is thus possible to improve the quality of information detected from the reflected light of the laser light from the readout magnetic domain to which the magnetization direction is copied by the laser light.

Moreover, in this method, since the external magnetic field can also be used as a recording magnetic field for writing the magnetization direction, for example, to the recording magnetic domain in the recording layer, it is possible to prevent an increase in the size which is caused if the external magnetic field is provided separately from the recording magnetic field.

A third readout method for reading information from the magneto-optical recording medium is based on the first readout method, and characterized by including the step of differentiating a readout signal detected from the readout magnetic domain.

In the third method, since the readout signal for reading information is differentiated, a sharper rise of the readout signal can be achieved, and the position of the recording magnetic domain can be more accurately detected through the readout magnetic domain. Therefore, even if the information which is recorded at higher density by reducing the size of the recording magnetic domain, it is possible to read the information recorded on the recording magnetic domain through the readout magnetic domain by the laser light.

For a fuller understanding of the nature and advantages of the invention, reference should be made to the ensuing detailed description taken in conjunction with the accompanying drawings.

BRIEF DESCRIPTION OF THE DRAWINGS

FIG. 12(a) and FIG. 12(b) are explanatory views showing still another method for recording information on the magneto-optical recording medium of the present invention.

FIG. 13 is a graph showing readout characteristics achieved by the recording method.

FIG. 14(a) and FIG. 14(b) are explanatory views showing a yet another method for recording information on the magneto-optical recording medium.

FIG. 15 is a graphs showing readout characteristics achieved by the recording method.

DETAILED DESCRIPTION OF THE PREFERRED EMBODIMENTS

[Embodiment 1]

The following description will discuss one embodiment of the present invention with reference to FIGS. 1(a), 1(b) to FIG. 5.

Figure 2:
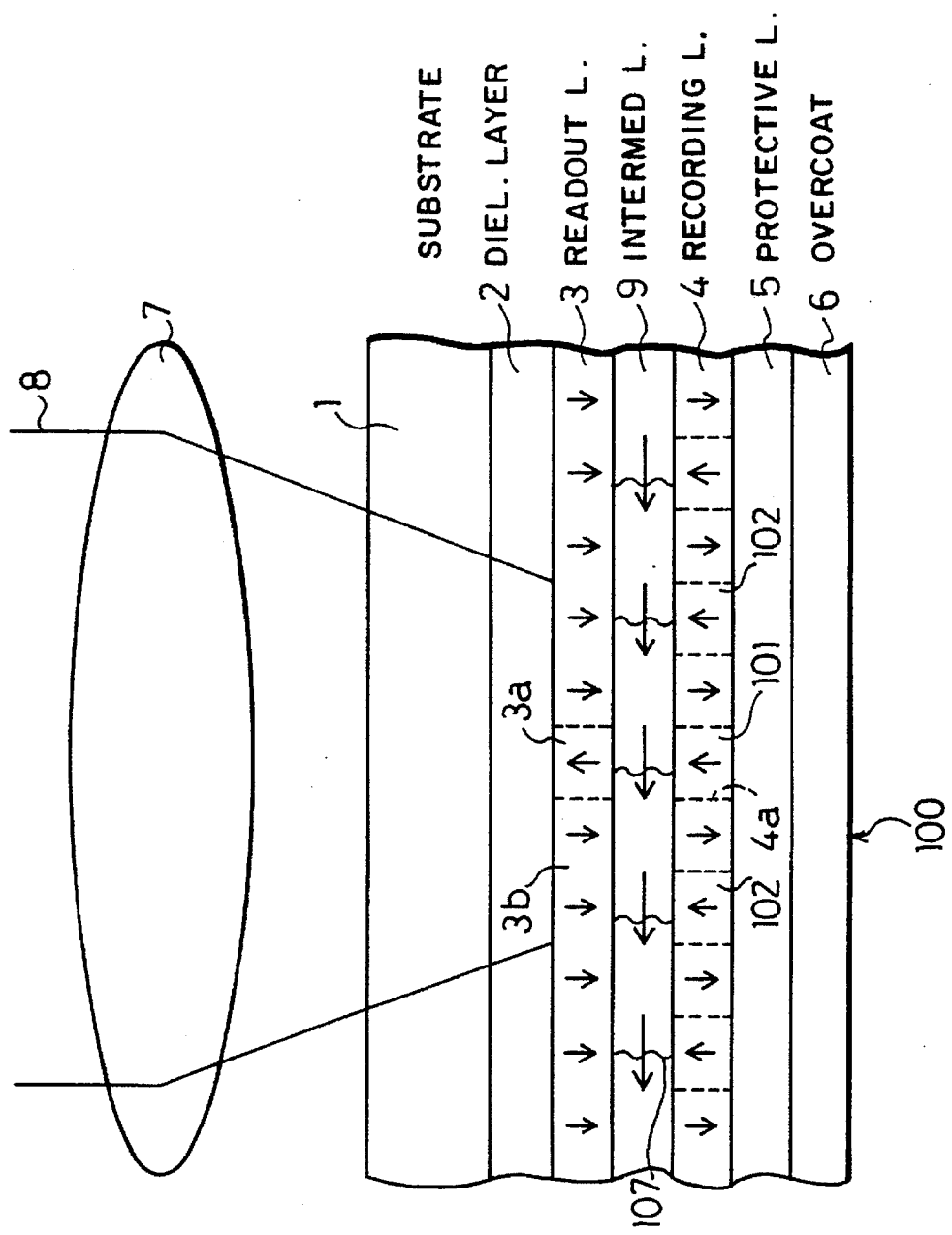
FIG. 2 is an explanatory view showing the structure of the magneto-optical recording medium.

As illustrated in FIG. 2, a magneto-optical recording medium is composed of a disk main body 100 including a substrate 1, a transparent dielectric layer 2, a readout layer 3, an intermediate layer 9 made of a film having in-plane magnetization, a recording layer 4, a protective layer 5 and an overcoat film 6 which are laminated in this order. The substrate 1 is formed in a disk shape from a transparent material, for example, polycarbonate.

The described magneto-optical recording medium adopts a recording method based on Curie temperature. Namely, a light beam 8 (laser light from a semiconductor laser) is converged onto the readout layer 3 by an objective lens 7, and information is recorded or read by the magneto-optical effect known as the polar Kerr effect.

The polar Kerr effect is a phenomenon which is observed when the light beam 8 is irradiated on a recording surface of a magneto-optical recording medium having antiparallel magnetization in mutually opposite directions perpendicular to the incident surface of the light beam 8, and the direction of rotation of rotatory polarization of the reflected light of the light beam 8 becomes opposite due to the magnetization direction.

The recording layer 4 is a magnetic film having perpendicular magnetization, made of rare earth-transition metal alloy. The recording layer 4 includes recording bits 101 and 102 for recording therein digital information using magnetization direction oriented in antiparallel directions perpendicular to the film surface, i.e., the direction of the thickness of the recording layer 4. The recording bits 101 and 102 are recording magnetic domains for recording therein information.

The readout layer 3 is composed of a magnetic film having perpendicular magnetization, made of rare earth-transition metal alloy. The readout layer 3 is formed on the recording layer 4 and includes readout bits to which the magnetization direction is copied from the recording bits 101 and 102. The readout bit is a readout magnetic domain for reading information.

The readout layer 3 has the following characteristics. The compensation temperature of the magnetic film with perpendicular magnetization is substantially room temperature. The saturation magnetization in the readout layer 3 increases as the temperature rises, and becomes maximum around the readout temperature. Moreover, the amount of the coercive force reduced in the process of rising temperature from room temperature to the readout temperature is smaller than the amount of the increase in the saturation magnetization.

In order to achieve stable small bits in the readout layer 3 of the magneto-optical recording medium, a minimum diameter $d_{min}$ as the stable magnetic domain width in which cylindrical magnetic domains oriented in opposite directions are present in mutually stable condition in the magnetic film with perpendicular magnetization is in proportion to $\sigma_W$ and in inverse-proportion to the product of $M_s$ and $H_c$. Here, $M_s$ is the saturation magnetization, i.e., spontaneous magnetization in the magnetic domain, $H_c$ is a coercive force, and $\sigma_W$ is the magnetostatic energy density of domain walls.

Additionally, when the compensation temperature is set in the vicinity of room temperature like the readout layer 3, the coercive force $H_c$ of the readout layer 3 becomes larger in the vicinity of the compensation temperature, and becomes smaller as the temperature is raised from the compensation temperature. On the other hand, the saturation magnetization $M_s$ of the readout layer 3 is zero at the compensation temperature. The saturation magnetization $M_s$ of the readout layer 3 becomes larger as the temperature is raised from the compensation temperature, and is maximized at a predetermined temperature, i.e., around the readout temperature. Then, the saturation magnetization $M_s$ is reduced to zero again at the Curie temperature of the readout layer 3.

In the readout layer 3 having the described composition, a change in coercive force $H_c$ in response to a temperature rise is smaller than a change in saturation magnetization $M_s$ in response to a temperature rise, and a substantially constant change in the density of magnetostatic energy of domain walls is shown in response to the temperature rise. Therefore, the decrease in the stable magnetic domain width in response to a temperature rise from room temperature to the readout temperature is assumed to be caused mainly by a change in the saturation magnetization $M_s$.

As a result, the stable magnetic domain width in the readout bit of the readout layer 3 can be made larger than the width 4a of the magnetic domain of the recording bits 101 and 102 at room temperature. On the other hand, when the temperature of the readout layer 3 is raised by the projected light beam 8 for detecting the magnetization direction of the readout bit, the stable magnetic domain width can be gradually reduced and becomes smaller than the width 4a of the recording magnetic domain.

The intermediate layer 9 made of a film having in-plane magnetization is provided between the recording layer 4 and the readout layer 3 so as to control a magnetic exchange coupling force between the recording layer 4 and the readout layer 3. The exchange coupling force determines the magnetic moment of two magnetic ions, i.e., the relative direction of the spin.

Namely, the intermediate layer 9 reduces the exchange coupling force between the recording layer 4 and the readout layer 3 having magnetization direction substantially perpendicular to the surface of the intermediate layer 9 to the same level as the magnetostatic coupling force between the recording layer 4 and the readout layer 3 by the in-plane magnetization which is parallel to the surface of the intermediate layer 9. Therefore, at room temperature, the intermediate layer 9 can prevent the direction of magnetization of the recording layer 4 from being copied to the readout layer 3 having a stable magnetic domain width larger than the magnetic domain width 4a of the respective recording bits 101 and 102 due to the exchange coupling force.

On the other hand, when the temperature of the readout layer 3 is raised to the readout temperature by the light beam 8, the stable magnetic domain width of the readout layer 3 becomes smaller. Consequently, the magnetization direction of the recording layer 4 is copied to the readout layer 3 by the magnetostatic coupling force and the exchange coupling force at the readout temperature.

Figure 1A:
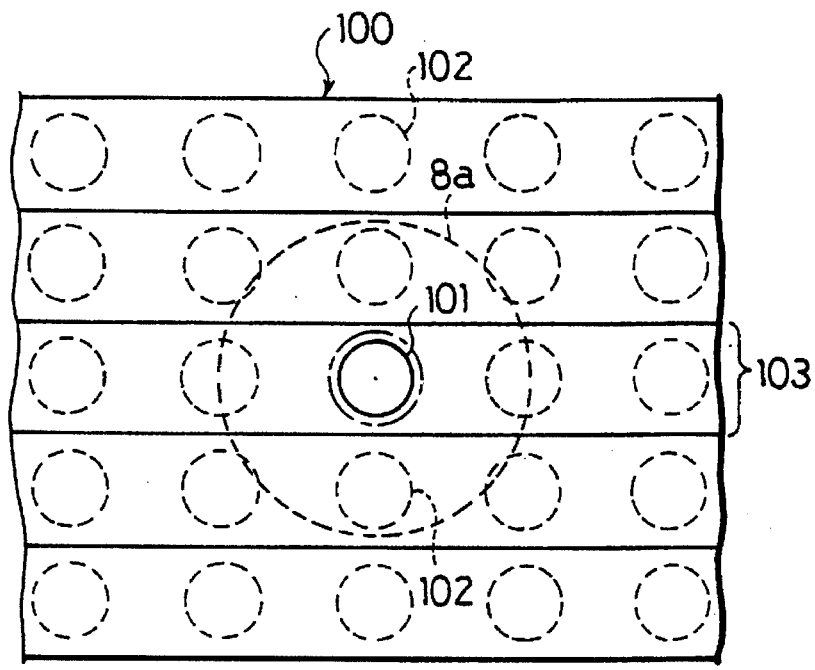
FIG. 1(a) is a schematic plan view showing a magneto-optical recording medium and a readout method of the present invention.
Figure 1B:
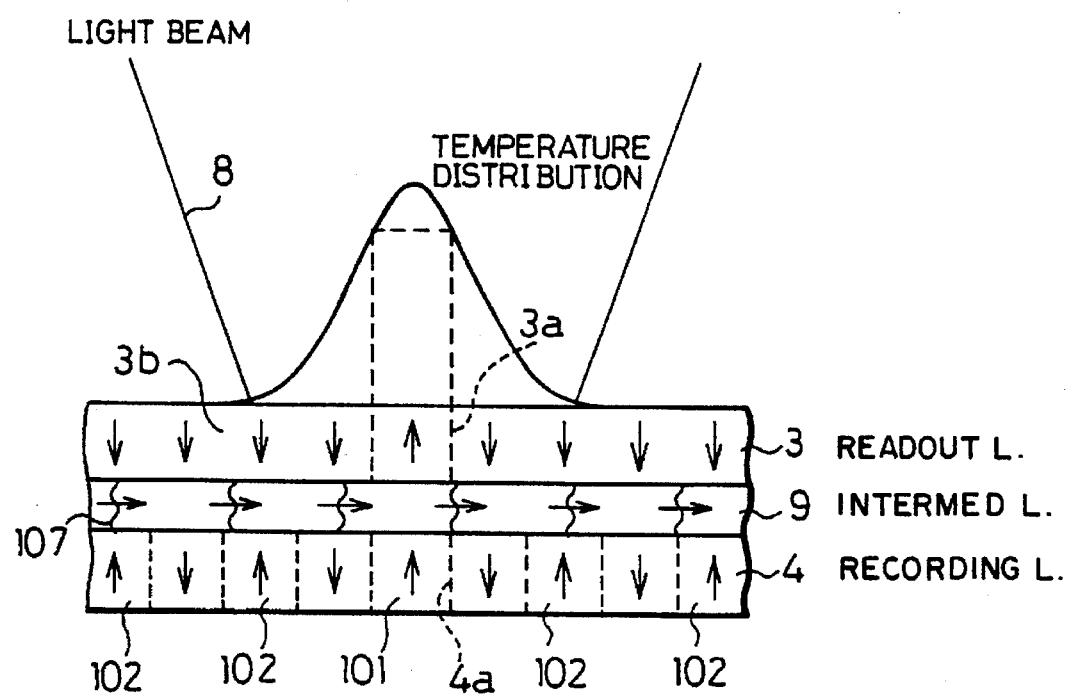
FIG. 1(b) shows a schematic cross section of FIG. 1(a).
Figure 22A:
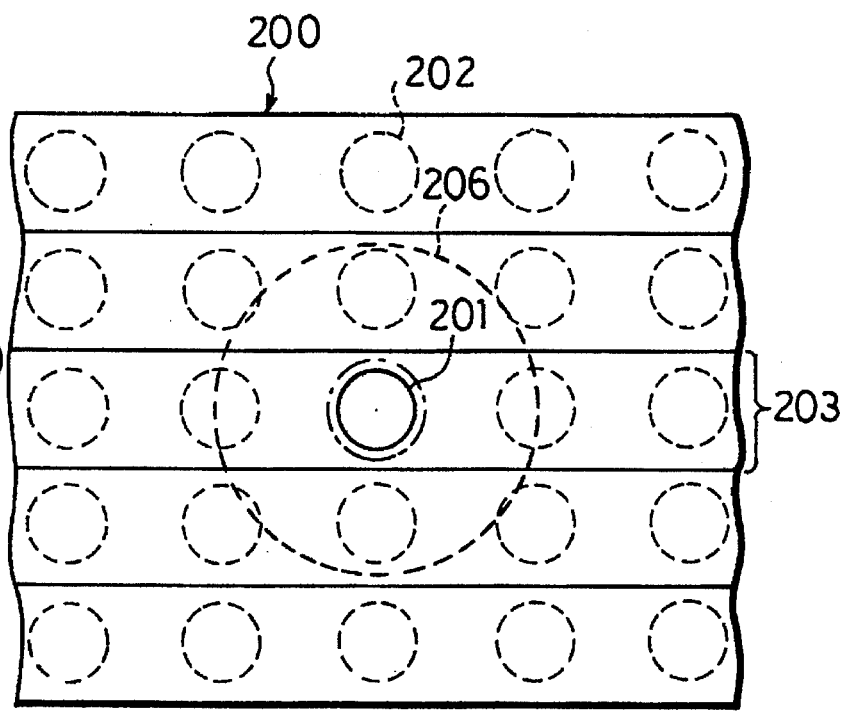
FIG. 22(a) and FIG. 22(b) are explanatory views showing a conventional magneto-optical recording medium and a readout method of the same.
Figure 22B:
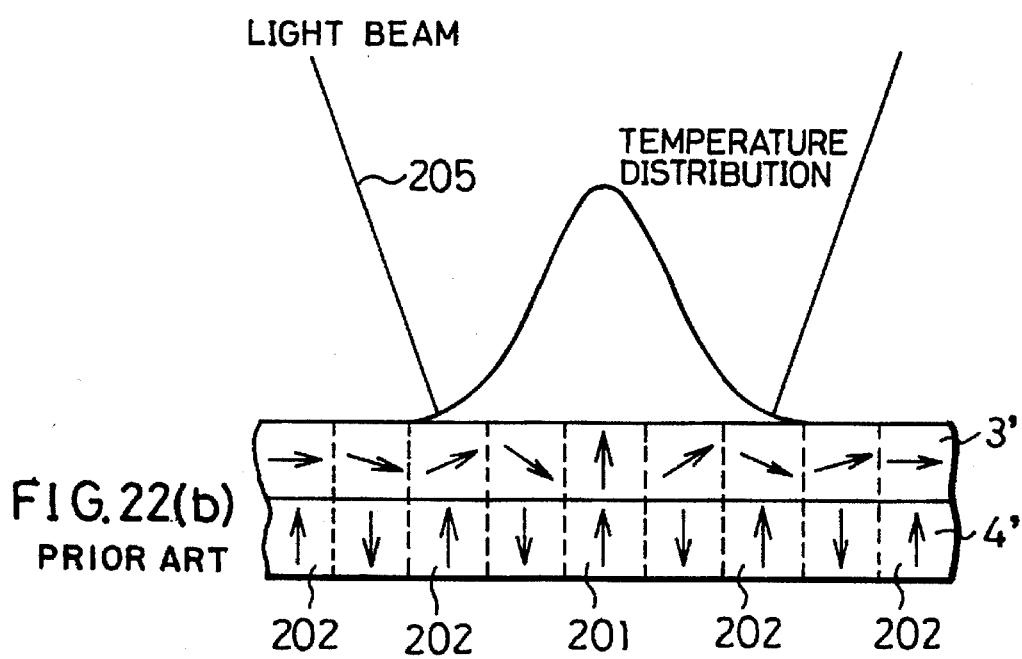

In the arrangement shown in FIG. 1(a) and FIG. 1(b), as in the case of the conventional arrangement shown in FIG. 22(a) and FIG. 22(b), along the track 103 formed in a spiral form or concentric form on the substrate 1, the recording bits 101 and 102 are formed at a predetermined interval.

In the described arrangement, at room temperature, as the stable magnetic domain width of the readout bit in the readout layer 3 is larger than the width 4a of the magnetic domain of the recording bits 101 and 102, it is impossible that the readout bit corresponding to the width of the recording bit 102 becomes unstable and does not exist. Moreover, since the intermediate layer 9 having in-plane magnetization is present, it is possible to reduce the exchange coupling force acting between the readout layer 3 and the recording layer 4 to the same level as the magnetostatic coupling force therebetween.

In this arrangement, as the exchange coupling force exerted from the recording layer 4 to the readout layer 3 is reduced to the same level as the magnetostatic coupling force by the intermediate layer 9 and as a readout bit having a width corresponding to the width of the recording bit 102 is unstable, the direction of magnetization of the readout bit in the readout layer 3 is not reversed along the direction of magnetization of the recording bit 102.

When the light beam 8 is converged onto the readout layer 3, and the same temperature distribution in which the temperature successively increases from the periphery toward the center of the spot 8a of the light beam 8 is shown on the readout layer 3, the intermediate layer 9 and the recording layer 4 in response to the temperature distribution (like Guassian distribution) of the light beam 8 in the direction of diameter.

In this case, in the portion of the readout layer 3 irradiated with the light spot 8a, the readout layer 3 can be set such that the stable magnetic domain width in the portion irradiated is smaller than the width of the recording bit 101 only at the central portion. Moreover, since the exchange coupling force acting between the readout layer 3 and the recording layer 4 is reduced to the same level as the magnetostatic coupling force therebetween due to the presence of the intermediate layer 9 made of a film having in-plane magnetization, it is possible to accurately readout information, which was recorded on the recording layer 4 through the readout layer 3 by the light beam 8, only from the central portion.

This can be achieved by the following reasons. As shown in FIG. 1(b), the readout bit 3a of a size corresponding to the recording bit 101 can be formed in a stable condition because the stable magnetic domain width of the readout bit becomes smaller as the temperature is raised by the light beam 8. Copying the condition of the recording layer 4 to the readout layer 3, for example, the reversed magnetization, can be carried out promptly by the magnetostatic coupling force due to a leakage magnetic flux acting between the recording layer 4 and the readout layer 3 and the magnetic exchange coupling force 107.

Moreover, in the described arrangement, when detecting with the light beam 8 the magnetization direction of the readout bit 3a wherein the magnetization direction of the recording bit 101 is copied in response to a temperature rise caused by the light beam 8, the effect from the magnetization direction in readout layer portions 3b being exposed to the light beam 8 other than the readout bit 3a can be avoided.

Namely, in the described arrangement, the readout layer 3 is arranged such that, when the temperature thereof is raised by the light beam 8 projected for detecting the magnetization direction in the readout bit 3a, the stable magnetic domain width of the readout bit 3a to be the central portion of the spot 8a of the light beam 8 varies and becomes not larger than the magnetic domain width 4a of the recording bit 101. Therefore, the readout layer portions 3b other than the readout bit 3a can be arranged so that the stable magnetic domain width of the readout bit 3a exceeds the magnetic domain width 4a of the recording bit 101 and that the magnetization direction in the facing recording bit 102 is not copied to the readout layer portions 3b.

Additionally, since the intermediate layer 9 made of a film having in-plane magnetization is present, the magnetic exchange coupling force 107 between the readout layer portions 3b and the recording layer 4 is small because the temperature of the readout layer portions 3b is room temperature or is not raised as high as the central portion. It is therefore possible to easily align the magnetization direction in the other readout layer portions 3b in one magnetization direction, for example, a downward direction (first magnetization direction) by, for example, an external magnetic force.

In the described arrangement, even if the magnetization direction in the readout bit 3a corresponding to the recording bit 101 having an upward magnetization direction (second magnetization direction) is switched from downward to upward by the projection of the light beam 8, the magnetization direction in other readout layer portions 3b adjoining to the readout bit 3a can be kept downward. Therefore, when detecting the magnetization direction in the readout bit 3a corresponding to the recording bit 101 by the light beam 8, it is possible to avoid the effect from the magnetization direction in the other readout layer portions 3b.

Thus, in the above-mentioned arrangement, it is possible to prevent the readout bit 3a detected by the light beam 8 from being affected by other readout layer portions 3b adjoining to the readout bit 3a. It is therefore possible to reduce the size of each recording bit 101, 102 and the interval between the recording bits 101 and 102, and read the information with accuracy even when the recording density of the information on the recording layer 4 is improved.

As described above, by copying to the readout layer 3 only the information in the recording bit 101 corresponding to the central portion of the spot 8a, subjected to the temperature rise, the information on the recording bit 101 to be read can be detected separately from the adjoining recording bits 102. Therefore, even if the respective recording densities of the recording bits 101 and 102 are raised, the information recorded in the recording bits 101 and 102 can be accurately read through the readout layer 3 in a stable condition.

In other words, with the presence of the intermediate layer 9 between the recording layer 4 and the readout layer 3, only in the central portion of the spot 8a of the light beam 8 where the temperature is raised, the magnetization direction of the readout bit 3a in the readout layer 3 is reversed corresponding to the recording bit 101 of the recording layer 4. At this time, in other portions where the temperature is not raised or is slightly raised, the magnetization direction in the readout layer 3 is not reversed, i.e., is not aligned with the magnetization direction of the facing recording layer 4. It is thus possible to accurately and stably achieve a magnetic super resolution technique which is based on whether or not the magnetization direction of the readout bit 3a is reversed during readout.

Next, a method for fabricating a magneto-optical recording medium having the above-mentioned arrangement will be explained.

In a sputtering device provided with targets of Al, GdFeCo alloy, GdFe alloy and DyFeCo alloy, the substrate 1, which was formed in a disk shape from polycarbonate and had pregrooves and prepits thereon, was placed on a substrate holder. Then, air was exhausted from the sputtering device to $1 \times 10^{-6}$ Torr, mixed gas of argon and nitrogen was introduced therein and an electric power was supplied to the Al target so as to form a transparent dielectric layer 2 of AlN on the substrate 1 under a gas pressure of $4 \times 10^{-3}$ Torr.

In order to improve the readout characteristic, the film thickness of the transparent dielectric layer 2 is set to around a value obtained by dividing a quarter of the wavelength of the readout light by the refractive index of the transparent dielectric layer 2. For example, when the readout light beam with a wavelength of 680 nm is used, the film thickness of the transparent dielectric layer 2 is arranged around a range of 10 nm to 80 nm. In this embodiment, the transparent dielectric layer 2 having a thickness of 50 nm was adopted.

Next, again, air was exhausted from the sputtering device to $1 \times 10^{-6}$ Torr, and argon gas was introduced therein. Then, an electric power was supplied to the GdFeCo alloy target so as to form the readout layer 3 of $Gd_{0.20}(Fe_{0.60}Co_{0.40})_{0.80}$ on the transparent dielectric layer 2 under a gas pressure of $4 \times 10^{-3}$ Torr. The readout layer 3 has a TM rich composition where the amount of the TM (transition metal) is always greater than the amount of the RE (rare earth) metal as compared with a compensation composition. The Curie temperature of the readout layer 3 is 420° C., and the compensation temperature thereof is 10° C.

It is preferable that the readout layer 3 has a thickness of not less than 10 nm so as to prevent magnetization information recorded on the recording layer 4 from being output as a signal due to the passage of the light beam 8 through the readout layer 3 to a degree. If the readout layer 3 is too thick, the light beam 8 with a greater power is required to raise the temperature, resulting in a lowering of the recording sensitivity. For this reason, it is preferable that the readout layer 3 has a thickness not more than 100 nm. In this embodiment, the readout layer 3 with a thickness of 40 nm was adopted.

In the next stage, by supplying an electric power to the GdFe alloy target, the intermediate layer 9 is formed from $Gd_{0.10}Fe_{0.90}$ on the readout layer 3 under a gas pressure of $4 \times 10^{-3}$ Torr. The intermediate layer 9 is an in-plane magnetization film having a magnetization direction parallel to the film surface in a temperature range from room temperature to its Curie temperature. The Curie temperature of the intermediate layer 9 was 280° C.

It is preferable that the intermediate layer 9 has a thickness between 3 nm and 50 nm to control the magnetic exchange coupling force 107 acting between the readout layer 3 and the recording layer 104 so that the magnetization direction in the recording layer 4 is not copied to the readout layer 3 by the exchange coupling force 107 at room temperature and that the magnetization direction in the recording layer 4 is copied to the readout layer 3 by a leakage magnetic flux and the exchange coupling force 107 with a rise in the temperature resulting from the irradiation of the laser light. In this embodiment, the intermediate layer 9 with a thickness of 10 nm was adopted.

By supplying an electric power to the DyFeCo alloy target, the recording layer 4 was formed by $Dy_{0.23}(Fe_{0.75}Co_{0.25})_{0.77}$ on the intermediate layer 9 under a gas pressure of $4 \times 10^{-3}$ Torr. The recording layer 4 is a film with perpendicular magnetization. The compensation temperature of the recording layer 4 was substantially room temperature, and the Curie temperature thereof was 250° C.

It is preferable that the recording layer 4 has a thickness of not less than 20 nm in order to stably keep the recording bits 101 and 102 wherein the magnetization direction has been recorded according to information. If the recording layer 4 is too thick, the light beam 8 with a greater laser power is required to raise the temperature, resulting in a lowering of the recording sensitivity. Accordingly, a preferred thickness of the recording layer 4 is not greater than 200 nm. In Embodiment 1, the recording layer 4 having a thickness of 40 nm was adopted.

Next, a mixed gas of argon and nitrogen was introduced into the sputtering device and the electric power was supplied to the Al target so as to form the protective layer 5 of AlN on the recording layer 4 under the same condition as that for forming the transparent dielectric layer 2.

The thickness of the protective layer 5 is not limited as long as the recording layer 4 can be protected from corrosion due to oxidization, etc. It is preferable that the thickness of the protective layer 5 is not less than 5 nm. In Embodiment 1, the protective layer 5 with a film thickness of 20 nm was adopted.

The overcoat film 6 was formed on the protective layer 5 by applying an ultraviolet ray hardening resin or a thermosetting resin by spin-coating and by irradiating ultraviolet ray or applying heat.

Figure 3:
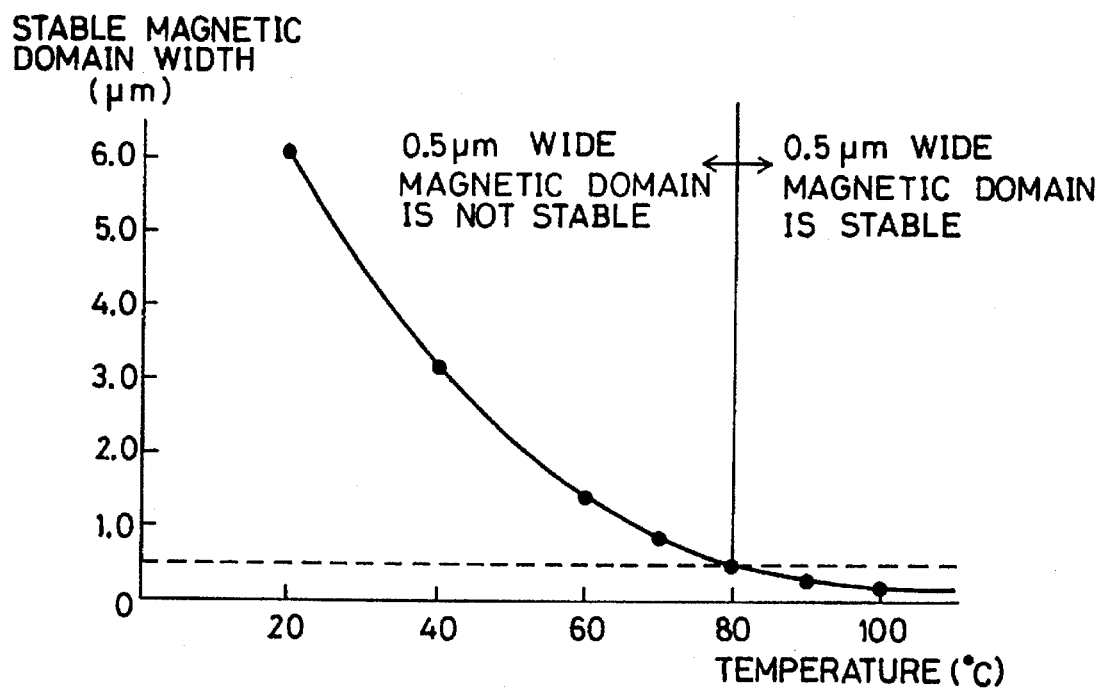
FIG. 3 is a graph showing magnetic characteristic of a readout layer in the magneto-optical recording medium.

In order to examine the temperature dependency of the stable magnetic domain width of the readout layer 3, a sample composed of a substrate 1 consisting of the readout layer 3 and the protective layer 5 was formed as a comparable example in the same manner as in Embodiment 1. With the use of this comparative sample, the temperature dependency of the stable magnetic domain width of the readout layer 3 was examined. The results are shown in the graph of FIG. 3. For the measurement of the stable magnetic domain width, the magnetic domain in a stripe shape which ensures a stable condition at each temperature was adopted in the readout layer 3.

As is clear from FIG. 3, the stable magnetic domain width becomes smaller as temperature is raised. For example, at room temperature, the magnetic domain having a width of 0.5 μm does not exist in a stable condition in the readout layer 3. However, as the temperature of the readout layer 3 is raised, for example, 80° C. or more, the magnetic domain having a width of 0.5 μm exits in a stable condition.

Next, the recording and readout characteristics of the magneto-optical recording medium prepared in Embodiment 1 were examined.

Figure 4:
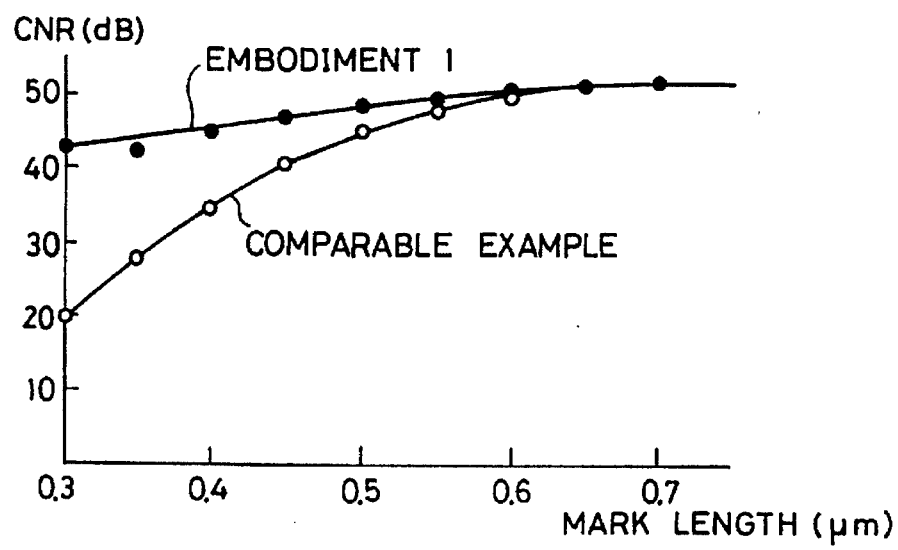
FIG. 4 is a graph showing recording and readout characteristics of the magneto-optical recording medium.

FIG. 4 shows a mark length dependency of the CNR (carrier to noise ratio) in the magneto-optical recording medium. After aligning the magnetization direction in the recording layer 4 in one direction, the light beam 8 with a power of 6 mW was projected in the form of pulses at a linear velocity of 5 m/s with a recording magnetic field of 10 kA/m so as to form recording bits with varying mark length at a pitch twice larger than the mark length. Thereafter, the CNR was measured with a readout laser power of 2 mW. The results are shown in FIG. 4.

For comparison, in the conventional arrangement shown in FIG. 22(a) and FIG. 22(b), the same measurements were performed with respect to a magneto-optical recording medium using a readout layer 3' made of $Gd_{0.28}(Fe_{0.82}Co_{0.18})_{0.72}$. The results are shown in FIG. 4. In this comparable example, since the magnetic exchange coupling force acted between the readout layer and the recording layer, a recording magnetic field of 65 kA/m was required to perform a satisfactory recording operation.

On the other hand, in the magneto-optical recording medium of Embodiment 1, since the intermediate layer 9 made of a film having in-plane magnetization was present between the readout layer 3 and the recording layer 4, the magnetic exchange coupling force acting between the readout layer 3 and the recording layer 4 was controlled to be smaller. It was thus possible to record information on the recording layer 4 with a weak recording magnetic field of around 10 kA/m as in the case where the recording layer 4 had a single layer structure.

As shown in FIG. 22(a) and FIG. 22(b), in the comparable example, the information on each adjoining recording bit 202 may interfere with information on the recording bit 201 to be read. On the other hand, in Embodiment 1, as shown in FIG. 1(a) and FIG. 1(b), the magnetization direction in the readout layer 3 corresponding to the adjoining recording bits 102 perfectly coincides with the magnetization direction in the surrounding area, thereby preventing the information in the adjoining recording bits 102 from interfering with information from the recording bit 101 to be read. As a result, compared to the comparable example, a still higher CNR can be obtained especially in an area where the mark length is short.

As is clear from FIG. 4, the magneto-optical recording medium in accordance with Embodiment 1 offers a CNR of 42 dB which is far higher than the comparable example even in the recording bit with a mark length of 0.3 μm and a mark pitch of 0.6 μm.

In the measurement of the CNR of the present invention, an optical system using laser light having a wavelength of 830 nm was adopted. It has been known that, with the use of such laser light, the recording bit to be read and the adjoining recording bits cannot be separated completely with respect to the normally recorded recording bit with a mark length of 0.3 μm and a mark pitch of 0.6 μm. Namely, in the case of reading the normally recorded recording bit with a mark length of 0.3 μm and a mark pitch of 0.6 μm by the laser light having a wavelength of 830 nm, the CNR becomes zero.

For the above-mentioned reason, according to the arrangement of Embodiment 1, when the recording bit is read by the laser light of a wavelength of 830 nm, a large CNR is obtained. Therefore, it can be seen that the magnetic super resolution phenomenon is achieved during readout.

Figure 5:
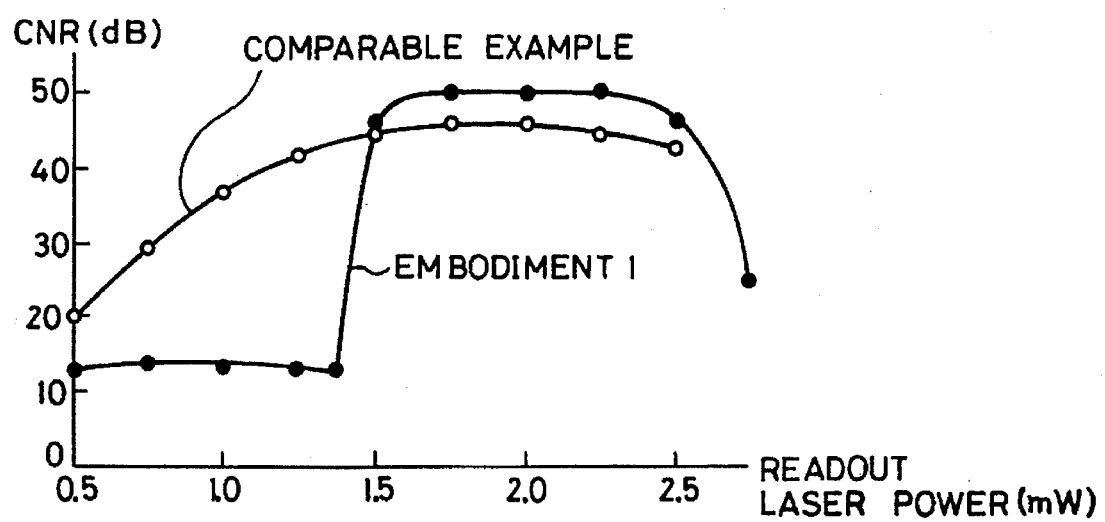
FIG. 5 is a graph showing recording and readout characteristics of the magneto-optical recording medium.

In order to examine the read power dependency of CNR, the CNR was measured by varying the readout laser power to be applied to the recording bit having a mark length of 0.5 μm and a mark pitch of 1.0 μm on the respective magneto-optical recording media of Embodiment 1 and the comparable example. The results are shown in FIG. 5

First, in the arrangement of the comparable example, the magnetization direction gradually changed from the in-plane magnetization to the perpendicular magnetization as the temperature rose. Therefore, the CNR became higher gradually as the readout laser power was increased. On the other hand, in the arrangement of Embodiment 1, the CNR suddenly increased at a readout laser power.

It is considered that such a sudden increase in CNR occurs when the recording bit 101 corresponding to a portion of the readout layer 3 subjected to the temperature rise is copied to the readout layer 3 by a leakage magnetic flux and the exchange coupling force 107 at the time the stable magnetic domain width of the readout layer 3 becomes smaller than the width of the recording bit with an increase in the readout laser power. In the area subjected to the low readout laser power, a certain degree of the CNR is observed. However, this is because the light which has passed through the readout layer 3 detects the magnetization directions in the recording bits 101 and 102 on the recording layer 4, and outputs readout signals.

As described above, in Embodiment 1, by setting the readout laser power above a laser power required for copying the magnetization direction in the recording bit 101 to the readout bit 3a, a signal can be read with an improved CNR compared with the conventional method. Moreover, by further increasing the readout laser power, the CNR suddenly drops. This is because the magnetization direction in the recording bit 102 adjacent to the recording bit 101 is also copied to the readout layer 3 and is detected.

For the described reason, when adopting the magneto-optical recording medium of the present invention, the readout laser power is set higher than that required for copying the magnetization direction in the recording bit 101 to be read to the readout layer 3, and smaller than the minimum laser power required to start copying the magnetization direction to the adjoining recording bits 102.

Next, by varying the film thicknesses of the readout layer 3, the intermediate layer 9 and the recording layer 4 and by preparing magneto-optical recording medium having recording bits with a mark length of 0.3 μm and a mark pitch 0.6 μm, the respective CNRs were measured. The results are shown in Table 1.

As a comparable example, magneto-optical recording media having an intermediate layer with a film thickness of 1 nm and 2 nm equivalent to the intermediate layer 9 were prepared, and the respective CNRs were measured. The results are also shown in Table 1.

TABLE 1

| Thickness of readout layer (nm) | Thickness of intermediate layer (nm) | Thickness of recording layer (nm) | CNR (dB) | Readout characteristic |
|---|---|---|---|---|
| Embodiment 1 and modified examples ||||| 
| 5 | 10 | 40 | 15 | o |
| 10 | 10 | 40 | 23 | o |
| 20 | 10 | 40 | 36 | o |
| 40 | 10 | 40 | 42 | o |
| 60 | 10 | 40 | 42 | o |
| 80 | 10 | 40 | 40 | o |
| 100 | 10 | 40 | 38 | o |
| 40 | 3 | 40 | 30 | o |
| 40 | 5 | 40 | 39 | o |
| 40 | 10 | 40 | 42 | o |
| 40 | 25 | 40 | 42 | o |
| 40 | 50 | 40 | 38 | o |
| 40 | 10 | 5 | 5 | o |
| 40 | 10 | 10 | 12 | o |
| 40 | 10 | 20 | 25 | o |
| 40 | 10 | 30 | 35 | o |
| 40 | 10 | 40 | 42 | o |
| 40 | 10 | 60 | 42 | o |
| 40 | 10 | 80 | 42 | o |
| 40 | 10 | 100 | 41 | o |
| Comparable examples ||||| 
| 40 | 1 | 40 | 0 | — |
| 40 | 2 | 40 | 0 | — |

As is clear from Table 1, some CNRs were obtained on the magneto-optical recording media of Embodiment 1 and the respective modified examples, having the recording bit with a mark length of 0.3 μm and a mark pitch of 0.6 μm. This proves that the magnetic super resolution phenomenon appears on these magneto-optical recording media as in the previous case.

In Table 1, the magneto-optical recording media in which a sudden increase in CNR resulting from an increase in readout laser power shown in FIG. 5 of this embodiment, i.e., the readout characteristics of the present invention, are observed are marked "o" in the column of the readout characteristic. In the range of film thickness adopted in the experiment except the intermediate layer having a film thickness of 1 nm or 2 nm, although the obtained CNRs were not identical, the magnetic super resolution phenomenon of the present invention was confirmed with respect to all of the magneto-optical recording media.

However, when the film thickness of the intermediate layer is 1 nm or 2 nm as in a comparable example, the magnetic exchange coupling force between the recording layer and the readout layer cannot be sufficiently controlled by the intermediate layer. Therefore, it seems that the magnetic super resolution phenomenon of the present invention is not confirmed because the information about the magnetization in the recording layer is copied to the readout layer by a strong exchange coupling force.

Next, with respect to various compositions of the readout layer 3, the CNRs on the respective magneto-optical recording media with a mark length of 0.3 μm and a mark pitch of 0.6 μm were measured as Embodiment 1, modified examples and comparable examples. The results of these measurements are shown in Table 2. In Table 2, X and Y show the ratio of the composition of $Gd_X(Fe_YCo_{1-Y})_{1-X}$ as the material for the readout layer 3. Additionally, in Table 2, E indicates Embodiment 1 and its modified examples, and C shows comparable examples.

TABLE 2

| | X | Y | CNR (dB) | Readout characteristic | Recording magnetic field (kA/m) |
|---|---|---|---|---|---|
| C | 0.08 | 0.60 | 0 | — | — |
| E | 0.13 | 0.60 | 16 | o | 10 |
|   | 0.15 | 0.60 | 35 | o | 10 |
|   | 0.20 | 0.60 | 42 | o | 10 |
|   | 0.26 | 0.60 | 38 | o | 10 |
| C | 0.28 | 0.60 | 0 | — | — |
|   | 0.20 | 0.47 | 0 | — | — |
| E | 0.20 | 0.50 | 25 | o | 10 |
|   | 0.20 | 0.75 | 42 | o | 10 |
|   | 0.20 | 1.00 | 30 | o | 10 |

As is clear from the results shown in Table 2, some CNR was obtained from each of the magneto-optical recording media of Embodiment 1 and the modified examples. Like the forgoing experiments, this means that the magnetic super resolution phenomenon was achieved on the respective magneto-optical recording media.

In Table 2, the magneto-optical recording media on which a sudden increase in CNR in response to an increase in the readout laser power like the read power dependency of the CNR shown in FIG. 5, i.e., excellent readout characteristics, were observed are marked "o" in the column of the readout characteristic. The strength of the recording magnetic field required for recording on the respective magneto-optical recording media are also shown in Table 2.

It is understood from Table 2 that if $Gd_X(Fe_YCo_{1-Y})_{1-X}$ is used as a material for the readout layer 3 of the present invention, X must be within a range $0.13 \leq X \leq 0.26$ when Y=0.60, and Y must be within a range $0.50 \leq Y \leq 1.00$ when X=0.20. This is because when the composition of the readout layer 3 does not satisfy the above-mentioned condition, the stable magnetic domain width at room temperature in the readout layer 3 made of GdFeCo becomes too small, and the magnetic state of the recording layer 4 is copied to the readout layer 3 at room temperature. Consequently, a super resolution phenomenon of the present invention cannot be achieved.

In Embodiment 1 and the modified examples, the transparent dielectric layer 2 made of AlN was used. However, it is also possible to use a transparent dielectric substance made of SiN, MgO, SiO, TaO, etc. However, since the rare earth-transition metal alloy film used in the readout layer 3 and the recording layer 4 is easily oxidized, it is desirable to use AlN or SiN which does not contain oxygen as a transparent dielectric layer.

In Embodiment 1 and the modified examples, the GdFeCo alloy was used as a readout layer 3. However, other materials may also be used for the readout layer 3 as long as the stable magnetic domain width varies in response to changes in temperature. Example of such materials includes films of rare earth-transition metal alloy such as GdFe alloy, GdDyFe alloy and GdDyFeCo alloy.

Moreover, in Embodiment 1 and the modified examples, GdFe was used as the intermediate layer 9 made of a film having in-plane magnetization. However, it is also possible to use films having in-plane magnetization other than the GdFe alloy as the intermediate layer 9 as long as the materials can control the exchange coupling force 107 acting between the readout layer 3 and the recording layer 4. Examples are films having in-plane magnetization made of rare-earth transition metal alloy, such as GdCo alloy, GdFeCo alloy, GdDyFe alloy, GdDyFeCo alloy, and films having in-plane magnetization made of Fe, Co, and FeCo alloys.

As modified examples, the DyFeCo alloy and the GdFeCo alloy used in Embodiment 1 were respectively used as the recording layer 4 and the readout layer 3, and the GdCo alloy, GdFeCo alloy, GdDyFe alloy, GdDyFeCo alloy, Fe, Co, and FeCo alloy were respectively used as materials for the intermediate layer 9 as a film having in-plane magnetization. The readout characteristic of each of the magneto-optical recording media of these modified examples was measured. The results are shown in Table 3.

TABLE 3

| Intermediate layer | Film thickness (nm) | CNR (dB) | Readout characteristic |
| --- | --- | --- | --- |
| $Gd_{0.1}Co_{0.9}$ | 10 | 41 | o |
| $Gd_{0.1}(Fe_{0.7}Co_{0.3})_{0.9}$ | 10 | 42 | o |
| $(Gd_{0.8}Dy_{0.2})_{0.1}Fe_{0.9}$ | 20 | 43 | o |
| $(GD_{0.8}Dy_{0.2})_{0.1}(Fe_{0.7}Co_{0.3})_{0.9}$ | 20 | 42 | o |
| Fe | 5 | 39 | o |
| Co | 5 | 37 | o |
| $Fe_{0.7}Co_{0.3}$ | 5 | 39 | o |

The results shown in Table 3 were obtained by measuring the readout characteristic under the same condition as in Table 1. The same phenomenon as the super resolution phenomenon of the present invention was observed on the magneto-optical recording media using the intermediate layer 9 having the respective compositions shown in Table 3.

In this embodiment, the recording layer 4 made of the DyFeCo alloy was used. However, it is also possible to use films of rare earth transition metal alloy such as TbFeCo alloy, TbDyFeCo alloy and GdTbFeCo alloy as the recording layer 4 as well as the DyFeCo alloy if these films can stably keep the respective magnetization directions as information to be recorded.

[Embodiment 2]

Referring to FIGS. 1(a), 1(b), 6 to 15, the following descriptions will discuss another magneto-optical recording medium and a method for readout information from the magneto-optical recording medium according to the present invention.

As is clear from FIG. 1(a) and FIG. 1(b), in the readout method of the present invention, it is preferable that the magnetization direction in the readout bit in the readout layer 3 is aligned in one direction beforehand in portions other than a portion irradiated with the light beam 8.

Figure 6:
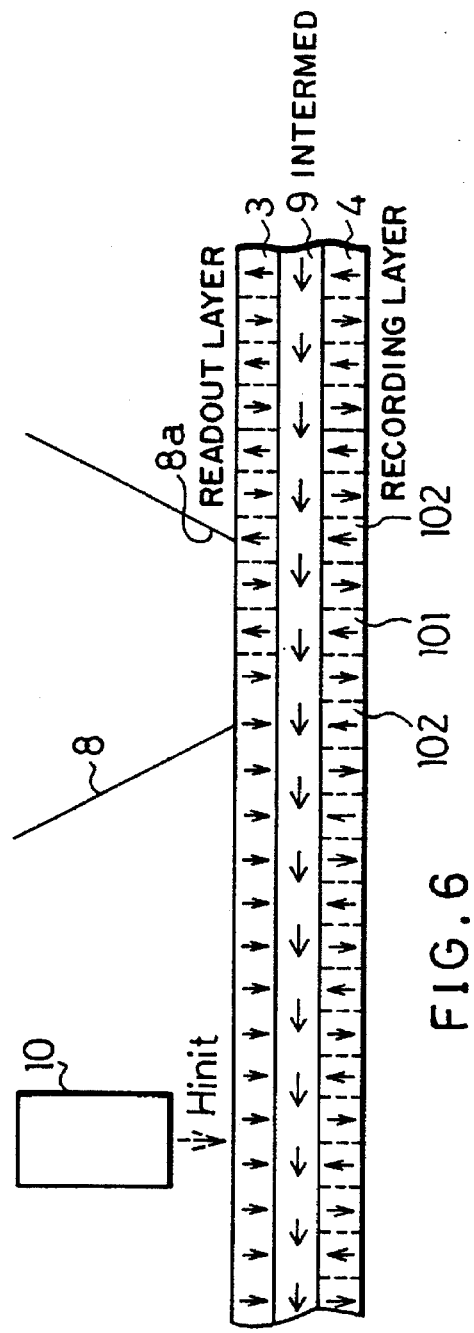
FIG. 6 is an explanatory view showing an external magnetic field and a readout layer in accordance with the readout method.

In this readout method, in order to align the magnetization direction in readout bits of the readout layer 3 in one direction, the readout layer 3 is initialized using an initialization magnet 10 before performing a readout operation using the light beam 8 as shown in FIG. 6. Namely, an initialization magnetic field $H_{init}$ which is larger than the coercive force of the readout layer 3 but is smaller than the coercive force of the recording layer 4 is applied to the readout layer 3 at room temperature before projecting the light beam 8 onto the readout layer 3. As a result, the magnetization direction in the readout layer 3 can be aligned in one direction.

In the magneto-optical recording medium of Embodiment 1, it is arranged such that the stable magnetic domain width of the readout layer 3 is larger than the width of the recording bits 101 and 102 of the recording layer 4 at room temperature. Therefore, the magnetization direction in the readout layer 3 will not be reversed, or aligned with the magnetization direction in the recording bits 101 of the recording layer 4 until the stable magnetic domain width of the readout layer 3 becomes smaller than that of the recording layer 4 as the temperature thereof is raised by the projection of the light beam 8.

In addition, on the above-mentioned magneto-optical recording medium, as described above, in portions of the readout layer 3 which do not correspond to the central portion of the spot 8a of the light beam 8, since the intermediate layer 9 controls the exchange coupling force, the magnetization direction in the recording bit 102 is not copied to the readout layer 3.

According to the described method, a readout operation can be performed from the readout magnetic domain 3a in the readout layer 3 without being affected by the magnetization direction in portions of the readout layer 3 other than the readout magnetic domain 3a, in which magnetization directions are not aligned in one direction. As a result, the above-mentioned magnetic super resolution phenomenon can be achieved, and it is possible to read the recording bits 101 and 102 whereon information is recorded in an area having a smaller diameter than the light spot 8a at an interval smaller than the diameter of the light spot 8a.

Moreover, in Embodiment 2, by initializing the readout layer 3 in the described manner, a wider composition range of the readout layer 3 for achieving the super resolution phenomenon can be achieved compared with Embodiment 1.

Namely, an unstable state in which the magnetization direction of the recording layer 4 is partly copied to the readout layer 3 at room temperature may be caused depending on the composition of the readout layer 3. However, by intentionally aligning the magnetization direction of the readout layer 3 in one direction through the initialization of the readout layer 3 as mentioned above, it is possible to prevent such an unstable state and widen the available composition range of the readout layer 3.

Figure 7:
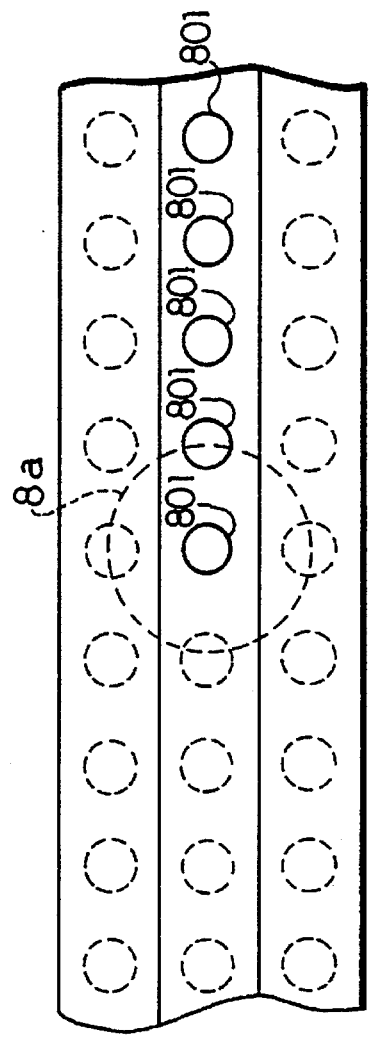
FIG. 7 is an explanatory view showing a light beam spot and recording bits in accordance with the readout method.

However, in Embodiment 2, as shown in FIG. 7, in a recording bit 801 after the passage of the light beam 8, the information copied to the readout layer 3 is kept until the next initialization is performed, and the effect of the magnetic super resolution phenomenon may be slightly reduced.

Figure 8:
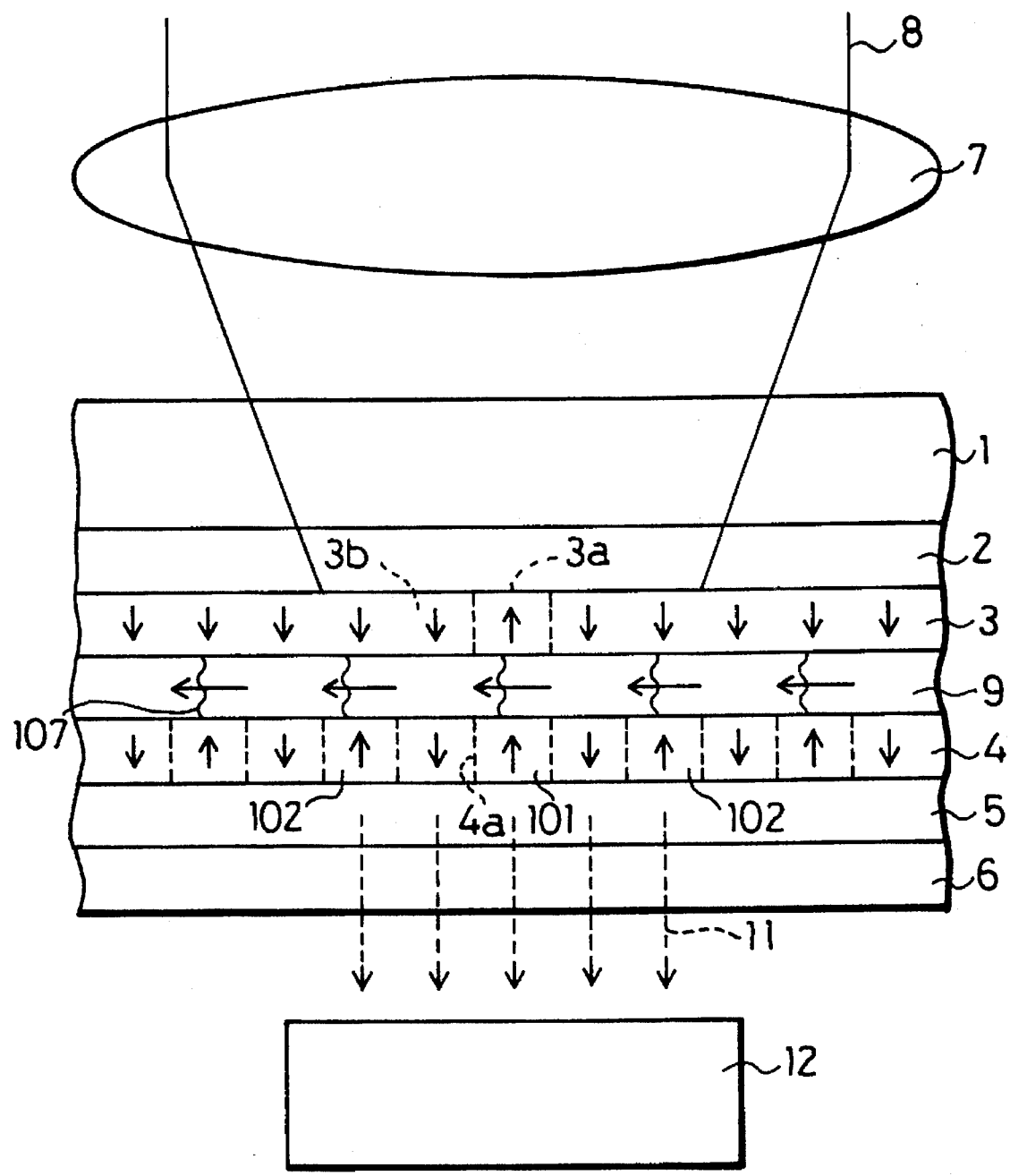
FIG. 8 is an explanatory view showing another readout method of the magneto-optical recording medium.

In order to prevent such a problem, as shown in FIG. 8, by applying a readout magnetic field 12 to a surface of the magneto-optical recording medium opposite to a surface irradiated with the light beam 8, the portions before and after the central portion of the irradiated area in the readout layer 3 can be initialized.

Namely, the temperature is raised by the projection of the light beam 8, and the magnetization direction in the recording layer 4 is copied only to a portion where the stable magnetic domain width is reduced by the magnetostatic coupling force acting between the recording layer 4 and the readout layer 3 and the controlled exchange coupling force 107 between the recording layer 4 and the readout layer 3. Meanwhile, in the portion where the temperature is not higher than a predetermined temperature, the magnetization direction in the readout layer 3 can be always aligned in one direction, for example, downward, by the readout magnetic field 12.

In this case, as in the case of using the initialization magnet 10, a still wider composition range of the readout layer 3, which enables the magnetic super resolution phenomenon of the present invention, can be achieved. Moreover, it is possible to achieve the magnetization state in the readout layer 3 shown in FIG. 1(a) and FIG. 1(b), i.e., to reverse the magnetization direction in the readout layer 3 only at a portion subjected to the temperature rise, thereby achieving the same super resolution phenomenon as in Embodiment 1. Furthermore, by arranging the readout magnetic field 12 and the recording magnetic field to be generated by the same means, Embodiment 2 can be carried out without increasing the size and the cost of the apparatus for reading information from the magneto-optical recording medium.

Figure 9:
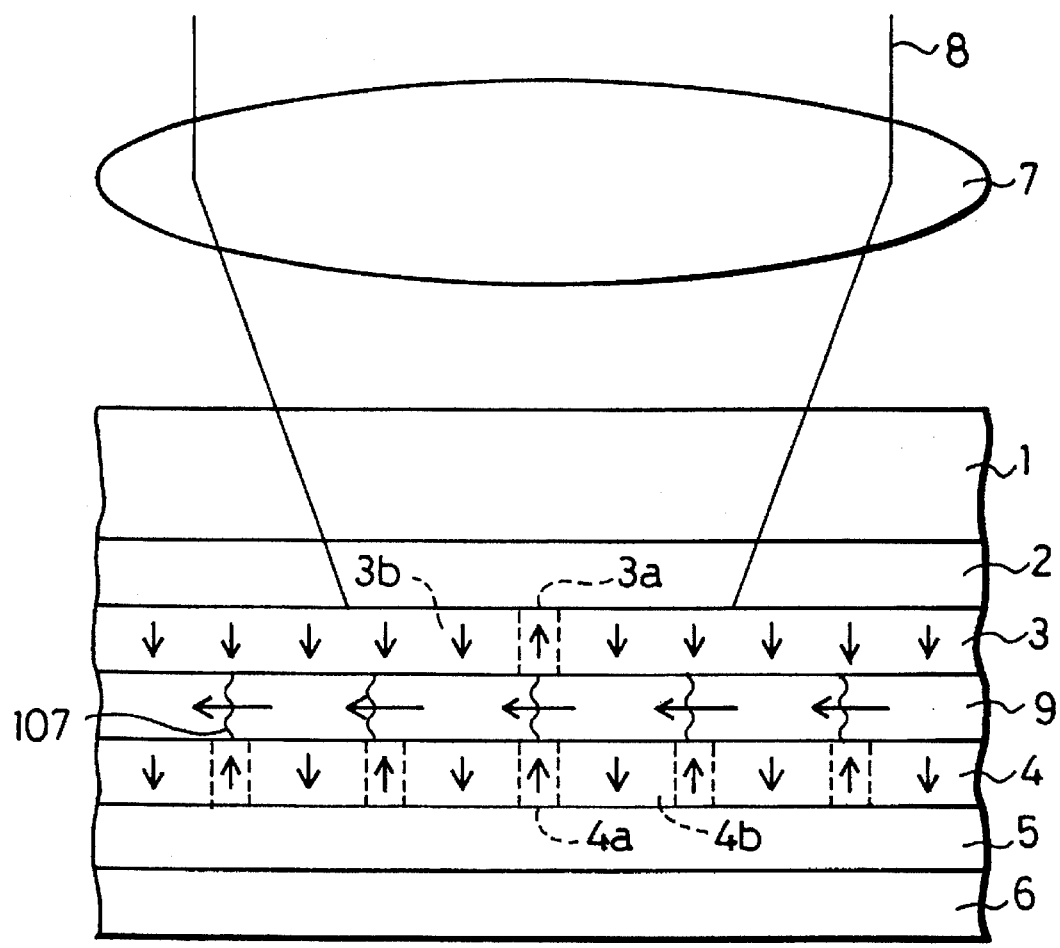
FIG. 9 is an explanatory view showing still another readout method of the magneto-optical recording medium, and another magneto-optical recording medium.

Referring now to FIG. 9, the magneto-optical recording medium of Embodiment 2 will be explained. On the recording layer 4, information is recorded by two magnetization directions which are anti-parallel to each other. Here, it is arranged that the magnetic domains in which the two magnetization directions are recorded have mutually different widths.

More specifically, in the recording layer 4, the recording layer 4 is arranged such that the width of the magnetic domain 4b having a larger recording bit width is smaller than the stable magnetic domain width of the readout layer 3 at room temperature. On the other hand, the width of the magnetic domain 4a having a smaller recording bit width in the recording layer 4 is equal to or larger than the stable magnetic domain width in the readout layer 3 whose temperature is raised to a temperature for readout.

In this case, with the use of the magnetostatic coupling force acting between the recording layer 4 and the readout layer 3 and the controlled exchange coupling force 107 between the recording layer 4 and the readout layer 3, it is possible to initialize portions of the readout layer 3 in front of and behind the reading magnetic domain 3a, which are not raised to a predetermined temperature.

Namely, the magnetostatic coupling force for aligning the magnetization directions in the recording layer 4 and the readout layer 3 in parallel and the controlled exchange coupling force 107 for aligning the sublattice magnetic moments of the rare earth and the transition metal in the recording layer 4 and the readout layer 3 in parallel from the recording layer 4 to the readout layer 3 are present in this magneto-optical recording medium. However, at room temperature, in a portion of the readout layer 3 facing the recording magnetic domain 4a with a smaller recording bit width, the magnetization direction in the readout layer 3 is prevented from being reversed by the magnetostatic coupling force and the exchange coupling force 107. On the other hand, the magnetization direction in the readout layer 3 at a portion facing the recording magnetic domain 4b with a greater width is aligned with the magnetization direction in the recording bit of the magnetic domain 4b.

Consequently, the readout layer 3, except for the central portion irradiated with the light beam 8, is initialized in the magnetization direction where the total magnetostatic coupling force and exchange coupling force 107 become relatively larger. The magnetization direction in the readout layer 3 is aligned in the magnetization direction in the recording bit of the magnetic domain 4b having a wider area in the recording layer 4 before and after the central portion except the central portion whereon the light beam 8 is projected, for example, downward, thereby initializing the readout layer 3.

In the described magneto-optical recording medium, when forming the recording bits 101 and 102 in the recording layer 4 initialized in the downward magnetization direction, it is required to perform a recording operation under the following condition: the width of the magnetic domain which is subject to non-recording portion (downward) is always relatively larger than the width of the magnetic domain of the recording portion (upward).

Figure 10A:
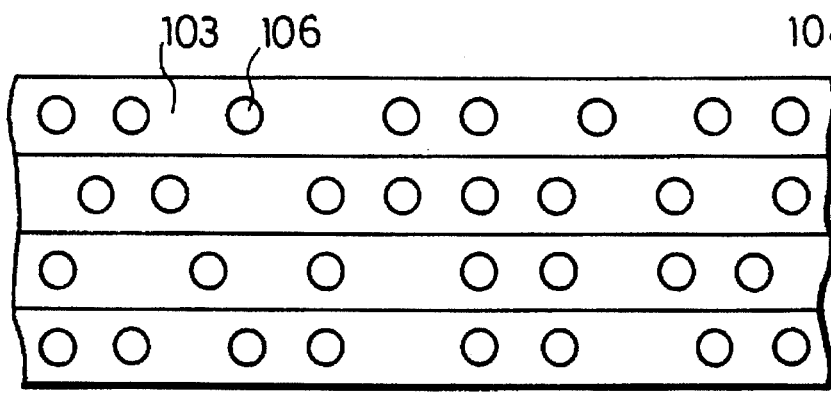
FIG. 10(a) and FIG. 10(b) are explanatory views showing a method for recording information on the magneto-optical recording medium of the present invention.
Figure 10B:
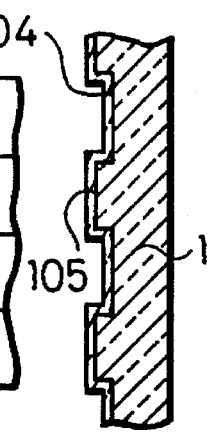

In order to set the non-recording portion relatively larger than the recording portion, as shown in FIG. 10(a) and FIG. 10(b), it is preferable in Embodiments 1 and 2 to adopt the mark position recording system for recording information at the position of the recording bit 106 formed on the track 103 as the groove portion 104 and the land portion 105.

Figure 11A:
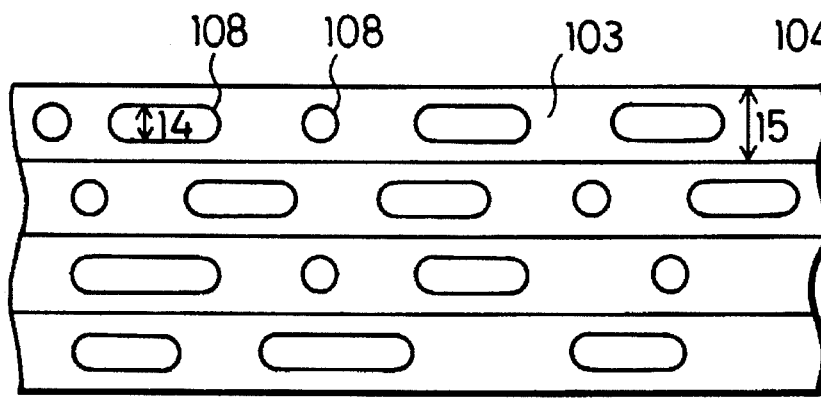
FIG. 11(a) and FIG. 11(b) are explanatory views showing another method for recording information on the magneto-optical recording medium of the present invention.
Figure 11B:
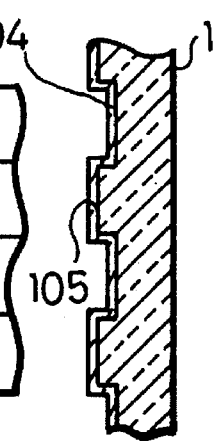

However, as shown in FIG. 11(a) and FIG. 11(b), in the mark edge recording for recording information with the length of the recording bit 108, by making the width of the recording bit 108 smaller than the width of the recording track 103 (for example, by setting the width (14 μm) of the recording bit 108 narrower than the width (15 μm) of the recording track 103), the non-recording portion can be made relatively larger than the recording portion, thereby achieving the super resolution phenomenon of Embodiments 1 and 2.

Next, when performing the mark edge recording using the land recording system, respective widths of the recording bits which achieve the super resolution phenomenon of Embodiments 1 and 2 were examined using the magneto-optical recording medium having the recording layer, the intermediate layer and the readout layer according to Embodiment 1.

As shown in FIG. 12(a) and FIG. 12(b), the above-mentioned magneto-optical recording medium includes the substrate 1 having a land section 301 with a pitch of 1.1 μm and a land width of 0.9 μm, and the recording layer, the intermediate layer and the readout layer described in Embodiment 1 on the substrate 1. The land section 301 has recording bits 109 with varying width (a μm). The CNR was measured from the respective magneto-optical recording media. The results are shown in FIG. 13.

As is clear from FIG. 13, in the case of adopting the recording bit having a width of 0.9 μm (a μm), an increase in the CNR resulting from an increase in readout laser power was not observed. This indicates that the information on the recording layer 4 is copied to the readout layer 3 at room temperature. Namely, it can be seen that the super resolution phenomenon of the present invention is not achieved by initializing the readout layer 3 by the controlled exchange coupling force 107 acting between the recording layer 4 and the readout layer 3.

On the other hand, by reducing the width of the recording bit, i.e., 0.8 μm, 0.7 μm, 0.6 μm, 0.5 μm and 0.4 μm, to be smaller than the width of the land section 301, an increase in the CNR resulting from an increase in readout laser power can be observed, thereby achieving the super resolution phenomenon of the present invention even if the readout layer 3 is initialized by the controlled exchange coupling force 107 acting between the recording layer 4 and the readout layer 3.

Thus, in the structure of the present invention, by making the width of the recording bit 109 smaller than the width of the recording track 103, i.e., the width of the land portion 301, it is possible to achieve the super resolution phenomenon when readout the recording bit 109, and improve the recording density of the recording bit 109.

Next, as shown in FIG. 14(a) and FIG. 14(b), when performing the mark edge recording by the land/groove recording system wherein recording is performed both on the land portion 302 and the groove portion 303 formed between the land portions 302, each recording bit width which enables the super resolution phenomenon of this embodiment was examined based on the readout laser power dependency.

First, on the substrate 1, the land portion 302 and the groove portion 303 between the land portions 302 were formed at a pitch of 1.4 µm and a land width of 0.7 µm. Then, a magneto-optical recording medium having the recording layer, intermediate layer and readout layer described in Embodiment 1 formed on the land portions 302 and the groove portions 303 was obtained.

Recording bits 304 having respective widths (a µm) were formed on the land portion 302 and the groove portion 303, and the readout laser power dependency of each magneto-optical recording medium was examined.

The results are shown in FIG. 15. As is clear from FIG. 15, in the case of adopting the recording bit 304 having a width of 0.6 µm, the CNR was not increased with an increase in the readout laser power. This means that information on the recording layer 4 is copied to the readout layer 3 at room temperature. Therefore, it can be seen that the readout layer 3 is not initialized by the magnetostatic coupling force and the controlled exchange coupling force 107 between the recording layer 4 and the readout layer 3, and the super resolution phenomenon of this embodiment cannot be achieved.

On the other hand, as the width of the recording bit 304 was set 0.5 µm, 0.4 µm and 0.3 µm respectively to be smaller than the width of the land portion 302 and groove portion 303, an increase in the CNR was observed with an increase in the readout laser power. In this case, it can be understood that the readout layer 3 is initialized by the magnetostatic coupling force acting between the recording layer 4 and the readout layer 3 and the controlled exchange coupling force 107 between the recording layer 4 and the readout layer 3, and the super resolution phenomenon of this embodiment can be achieved.

Namely, in the structure of the present invention, even if the width of the recording bit 304 is set smaller than the width of the recording track, i.e., the width of the land portion 302 or the groove portion 303, it is possible to achieve the super resolution phenomenon when readout the recording bit 304, thereby improving the recording density of the recording bit 304.

[Embodiment 3]

Referring to FIGS. 16 to 21, the following description will discuss another method as Embodiment 3 for readout information from the magneto-optical recording medium in accordance with the present invention.

Figure 16:
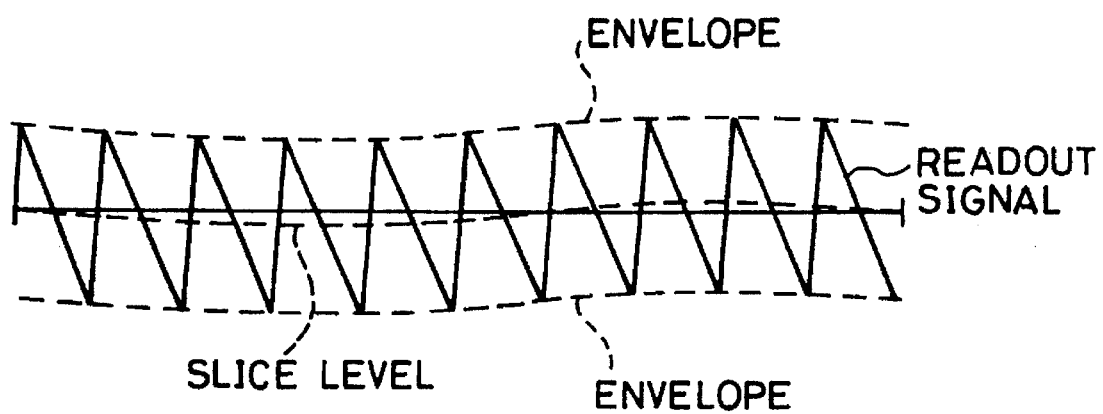
FIG. 16 is an explanatory view showing a waveform of a readout signal from the magneto-optical recording medium of the present invention.

When performing the land/groove recording shown in FIG. 14(a) and FIG. 14(b) using the recording bit with a pitch of 0.8 µm and a diameter of 0.4 µm, the waveform of an output signal during readout has such a characteristic that a rise of a readout signal is by far sharper than the fall of the readout signal as shown in FIG. 16.

Figure 17A:
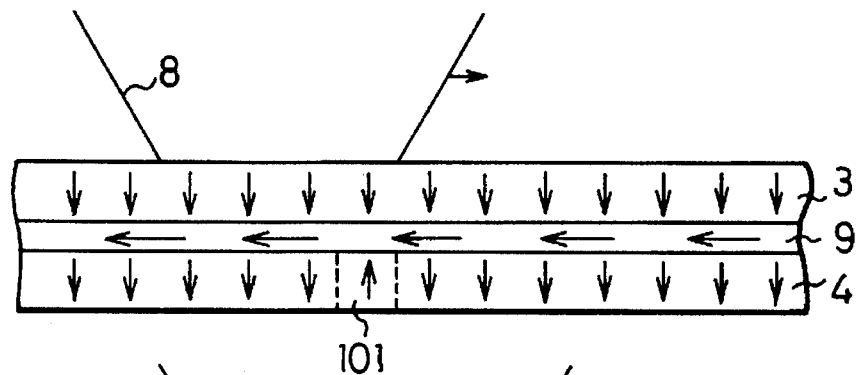
FIG. 17(a) through FIG. 17(d) are explanatory views showing a principle of obtaining the waveform.

The mechanism for generating such a waveform will be explained with reference to FIG. 17(a) to FIG. 17(d). First, as shown in FIG. 17(a), as the magneto-optical recording medium rotates during the readout operation, the recording bit 101 on the recording layer 4 enters into the spot of the light beam 8. However, as a sufficient rise in temperature is not shown and the stable magnetic domain width in the readout layer 3 is still larger than the width of the magnetic domain in the recording bit 101, the direction of the magnetic domain in the recording bit 101 is not copied to the readout layer 3.

Figure 17B:
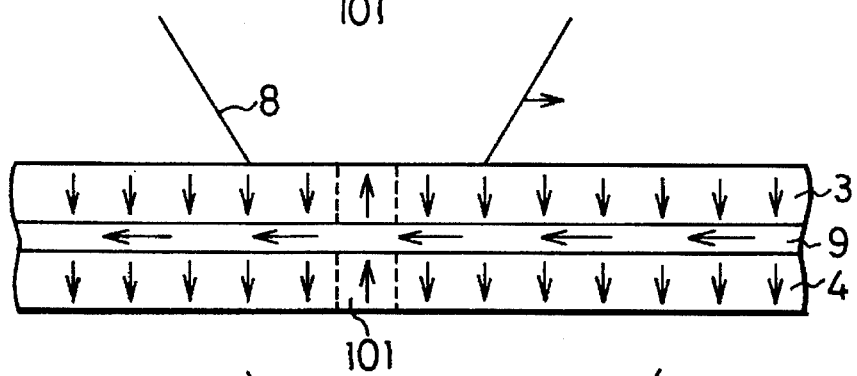

Next, when the readout layer 3 is moved with a rotation of the magneto-optical recording medium, as shown in FIG. 17(b), a portion of the readout layer 3 corresponding to the recording bit 101 is heated to or above a predetermined temperature by the irradiation of the light beam 8, and the stable magnetic domain width of the readout layer 3 becomes substantially identical with the width of the magnetic domain in the recording bit 101. At this time, the magnetization direction in the recording bit 101 is instantaneously copied to the readout layer 3, thereby causing a sudden rise of the readout signal as shown in FIG. 16.

Figure 17C:
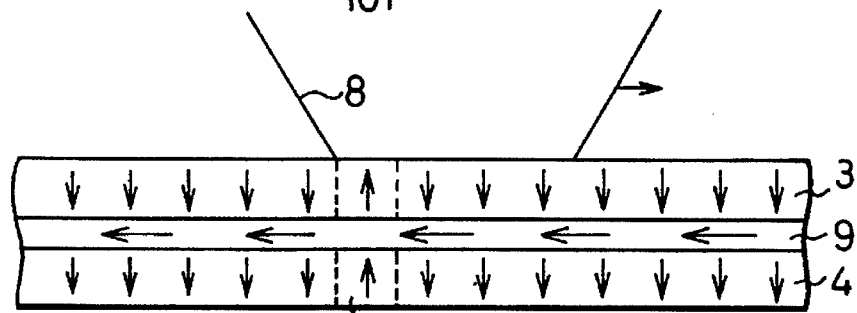

Then, when the magneto-optical recording medium is further moved, as shown in FIG. 17(c), since the temperature is cooled off at relatively lower speed compared with the temperature rising process, the direction of the magnetic domain copied to the readout layer 3 is maintained.

Figure 17D:
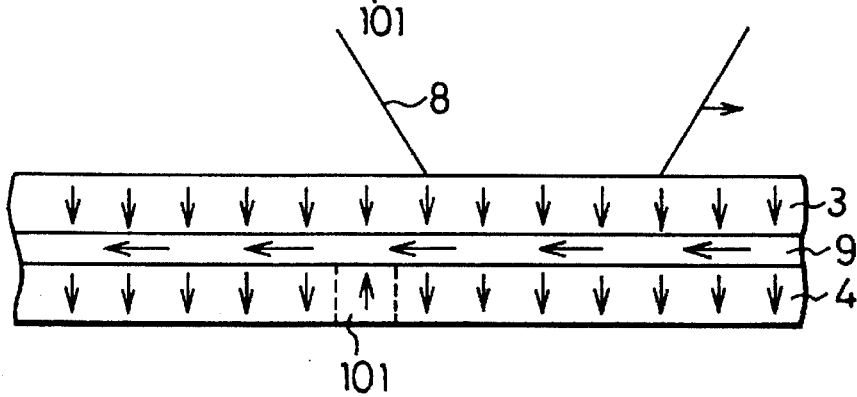

Thereafter, as the magneto-optical recording medium is further moved, as shown in FIG. 17(d), the temperature of the portion corresponding to the recording bit 101 of the readout layer 3 is sufficiently lowered, and the copied magnetization direction in the portion of the readout layer 3 is erased by the initialization means.

Therefore, when erasing the copied magnetization direction, about the same amount of drop in readout signal is shown as that in the normal readout operation where the recording bit 101 is moved outside the spot of the light beam 8 as the magneto-optical recording medium is moved.

Figure 18:
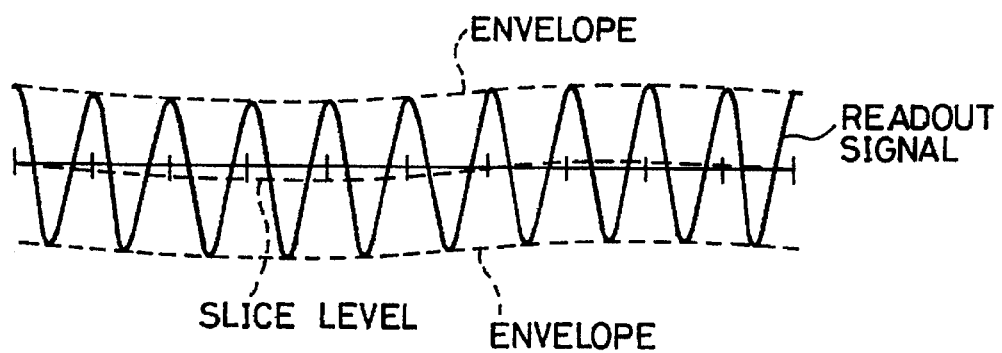
FIG. 18 is a graph showing the waveform of a readout signal from a conventional magneto-optical recording medium.

As shown in FIG. 18, in a conventional magneto-optical recording medium composed of a generally used magnetic layer of a single layer structure, the recording bit is moved in the spot of the light beam as the laser light moves, thereby obtaining a readout signal of like a sine curve.

In general, since a differential detecting method is adopted in the magneto-optical recording medium, in the resulting readout signal, the variation in amplitude of the signal due to variations in reflectance is suppressed to a certain degree. However, as the variation in signal amplitude remains due to variation in birefringence, etc., that cannot be suppressed by the differential detection, as shown in FIG. 16 and FIG. 18, the readout signal shows a smooth up-down movement. In this case, by setting the fixed voltage level to the slice level, the correct position of the recording bit 101 cannot be detected due to the smooth up-down movement of the signal amplitude.

Therefore, in order to suppress the readout error due to the up-down movement, a final signal is generally obtained by an envelope detection. Namely, by detecting an envelope of the readout signal, the slice level is set based on the average level of the envelope. As a result, the variation in detection position of the recording bit 101 due to the up-down movement can be suppressed, thereby achieving an accurate detection of the position of the recording bit 101.

In the readout signal shown in FIG. 16 from the magneto-optical recording medium of the present invention, a smooth up-down movement of the signal amplitude can be seen. Compared with the conventional method shown in FIG. 18, in such an up-down movement, since a sudden increase in the readout signal is shown, when setting the slice level based on the fixed voltage level, the position of the recording bit 101 can be detected more accurately. In this case, it is desirable to obtain the final readout signal by performing the envelope detection and correcting the up-down movement like the method shown in FIG. 18.

Figure 20:
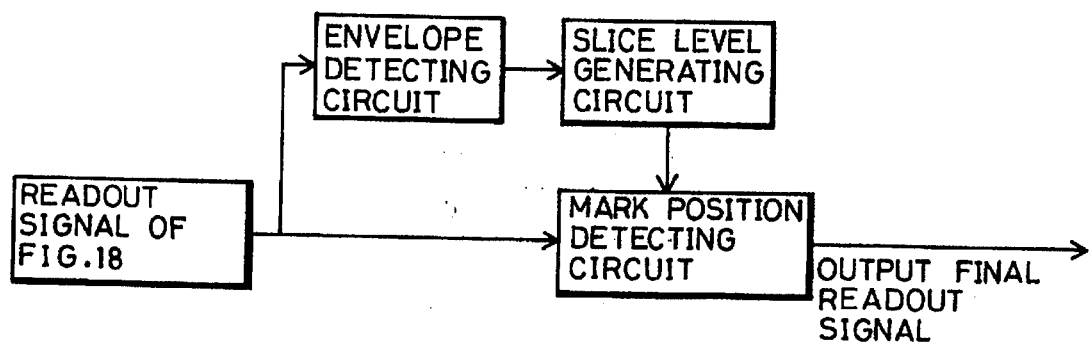
FIG. 20 is a block diagram for correcting the waveform of a readout signal obtained from a conventional magneto-optical recording medium by a readout method.
Figure 21:
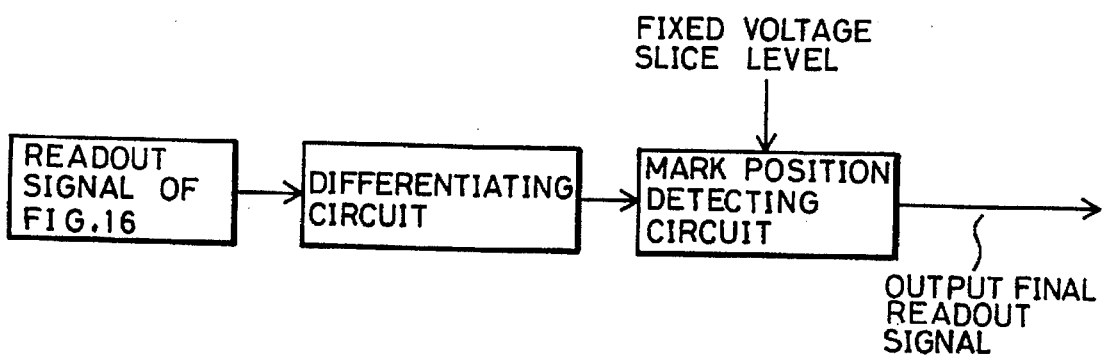
FIG. 21 is a block diagram for correcting the waveform of a readout signal used in the method for reading information from the magneto-optical recording medium of the present invention.

When processing the readout signal by the envelope detection, as shown in the block diagram of FIG. 20, it is required to delay the readout signal by introducing a delay with the envelope detection. This causes such a problem that the circuit becomes complicated, and the troublesome task of synchronizing the up-and-down movement of the slice level with the up-and-down movement of the readout signal by the envelope detection.

Like the conventional method shown in FIG. 18, when the readout signal shows a sine curve, the differentiation of the readout signal only results in the phase shift of the readout signal. It is thus difficult to greatly change the waveform of the readout signal.

Figure 19:
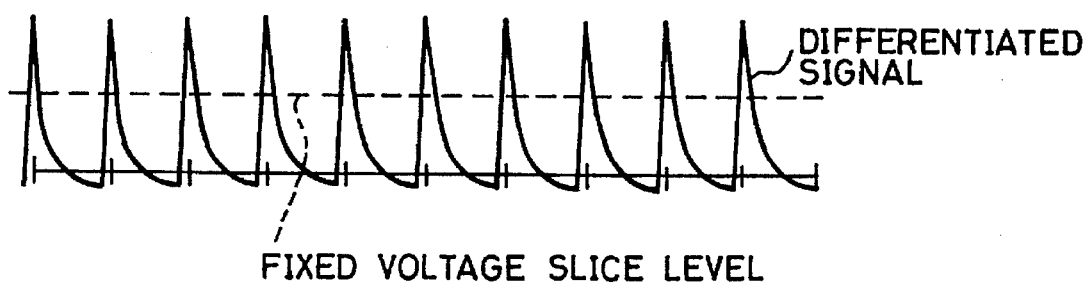
FIG. 19 is a graph showing the waveform of a differentiated readout signal from the magneto-optical recording medium of the present invention.

However, in Embodiment 3, a rise in the resulting readout signal is extremely sharp. Therefore, by differentiating the readout signal, as shown in FIG. 19, the smooth variation in the amplitude of the readout signal can be removed from the readout signal, and only the portion subject to a sharp change in readout signal, i.e., the rising portion of the readout signal can be obtained as a differentiated output.

As described above, according to Embodiment 3, even if a circuit for detecting an envelope and a circuit for generating a slice level which varies depending on the circuit for detecting an envelope are omitted, an adverse effect of a smooth up-down movement of the signal amplitude can be removed by differentiating the resulting readout signal. As a result, a final readout signal indicating a correct position of the recording bit 101 can be obtained, thereby omitting the envelope detecting circuit and the delay circuit of the conventional arrangement. The readout signal can be processed accurately by a simple circuit structure using the fixed voltage slice level shown in FIG. 21.

In the method for readout information on the magneto-optical medium of Embodiment 3, the smooth up-down movement of a signal amplitude can be removed from the resulting readout signal by differentiating the readout signal. Therefore, a final readout signal which detects a correct position of the recording bit 101 can be obtained from the readout signal, thereby suppressing the signal quality required for the readout signal.

Namely, the signal having a quality of not more than 45 dB in CNR prior to signal processing cannot achieve an error rate of not higher than $1 \times 10^{-5}$ that is required for a magneto-optical disk. However, in Embodiment 3, the error rate required for the magneto-optical disk as the magneto-optical recording medium is even obtained with a signal whose quality has deteriorated to around 35 dB prior to signal processing, thereby achieving high-density recording and readout. The examination data which enables such high-density recording and readout are shown in Table 4.

TABLE 4

| Bit length (μm) | Comparable example | | Embodiment 3 | | |
|---|---|---|---|---|---|
| | CNR1 (dB) | Er1 (× 10⁻⁵) | CNR2 (dB) | Er2 (× 10⁻⁵) | Er3 (× 10⁻⁵) |
| 0.8 | 50 | 0.4 | 48 | 0.3 | 0.1 |
| 0.6 | 46 | 0.4 | 49 | 0.2 | 0.1 |
| 0.5 | 43 | 1.5 | 48 | 0.3 | 0.2 |
| 0.4 | 39 | 5.0 | 46 | 0.8 | 0.3 |
| 0.35 | — | — | 40 | 1.9 | 0.5 |
| 0.3 | — | — | 35 | 8.0 | 1.0 |
| 0.25 | — | — | 25 | 20.0 | 5.0 |

As is clear from Table 4, in the CNR1 as another comparable example, if the bit length is not less than 0.6 μm, a desired error rate (not higher than $1 \times 10^{-5}$) is obtained as shown under the column of Er1. On the other hand, in the CNR 2 showing the result of Embodiment 3, even if the readout signal is not differentiated, as shown under the column of Er2, a desired error rate of not higher than $1 \times 10^{-5}$ is obtained with a bit length of not less than 0.4 μm, thereby achieving a higher density than the conventional method.

Moreover, in the case where the readout signal is differentiated, as shown under the column of Er3, a desired error rate of not higher than $1 \times 10^{-5}$ is obtained with a bit length of not less than 0.3 μm, thereby achieving a still higher density.

In order to eliminate the deficiencies associated with the conventional method, several presentations were made on super resolution magneto-optical readout technique in the MORIS'94. The No. 29-K-04 "MSR Disks with Three Magnetic Layers Using In-Plane Magnetization Films" (p. 125) of the above-mentioned presentation discloses that by providing an intermediate layer having an in-plane magnetization between the readout layer and the recording layer having an in-plane magnetization at room temperature, in which a transition to perpendicular magnetization occurs at an elevated temperature, a front mask and a rear mask which have in-plane magnetization are formed. It is also disclosed that the readout signal changes sharply by the rear mask.

The No. 29-K-06 "New Readout Technique Using Domain Collapse on Magnetic Multilayer" (p. 127) discloses that a desirable jitter characteristic can be achieved by the sudden change in the signal from the rear mask. It is also disclosed that by differentiating the readout signal, the position of the recording bit can be detected with accuracy.

The No. 29-K-05 "Magnetically-Induced Super Resolution Using Magneto-Static Coupling" (p. 126) discloses the technique for forming the front mask and rear mask which have in-plane magnetization by providing a non-magnetic intermediate layer for shutting off an exchange coupling force between a writing layer which has perpendicular magnetization and a reading layer which has an in-plane magnetization at room temperature and a perpendicular magnetization at increased temperature. It is further disclosed that a sudden change in the readout signal is shown by the rear mask.

However, the structures of all of the above-mentioned three presentations give a readout signal showing a sudden lowering due to the rear mask. Such structures are considered to be irrelevant to the present invention related to the generation of a readout signal showing a sudden rise.

Moreover, although the techniques disclosed by the above-mentioned two presentations No. 29-K-04 and No. 29-K-06 use a magnetic film as the intermediate layer like the present invention, they achieve super resolution by the elimination of the magnetic domain in the reading layer. The present invention differs from the structure of these two presentations, and achieves super resolution by the generation of a magnetic domain in the readout layer.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium formed on a substrate, comprising:

a recording layer composed of a film with perpendicular magnetization, including a recording magnetic domain in which information is recorded by the perpendicular magnetization;

a readout layer composed of a film with perpendicular magnetization on said recording layer, including a readout magnetic domain to which the magnetization direction in said recording magnetic domain is copied, wherein a width of a stable magnetic domain capable of being exist stably in said readout magnetic domain is larger than a width of said recording magnetic domain at room temperature and becomes equal to or smaller than a width of said recording magnetic domain at an elevated predetermined temperature above room temperature; and an intermediate layer composed of a film with in-plane magnetization, said intermediate layer being arranged between said recording layer and said readout layer for controlling a magnetic exchange coupling force acting between said recording layer and said readout layer to be small so that, in a portion which is not irradiated with laser light for detecting the magnetization direction of said readout magnetic domain, the magnetization direction of said readout magnetic domain is not copied.

2. The magneto-optical recording medium as set forth in claim 1, wherein, when a temperature of said readout magnetic domain is raised by the laser light and the stable magnetic domain width becomes identical with the width of said recording magnetic domain, the magnetization direction in said recording magnetic domain is copied to said readout magnetic domain facing said recording magnetic domain by a magnetostatic coupling force and an magnetic exchange coupling force.

3. The magneto-optical recording medium as set forth in claim 1, wherein said recording layer includes a first recording magnetic domain and a second magnetic domain respectively having perpendicular magnetization directions, the perpendicular magnetization directions in recording magnetic domains being anti-parallel, the width of said first recording magnetic domain being larger than the width of said second recording magnetic domain, and said readout layer has a small stable magnetic domain width in said readout magnetic domain until the stable magnetic domain width becomes substantially identical with the magnetic domain width of said second recording magnetic domain at an elevated temperature resulting from irradiation of the laser light.

4. The magneto-optical recording medium as set forth in claim 1, wherein a film thickness of said readout layer is between 10 and 100 nm, a film thickness of said intermediate layer is between 3 and 50 nm, and a film thickness of said recording layer is between 20 and 200 nm.

5. The magneto-optical recording medium as set forth in claim 1, wherein said readout layer is made of GdFeCo, and if GdFeCo is represented by $Gd_x(Fe_yCo_{1-y})_{1-x}$, said readout layer satisfies a relation that $0.13 \leq X \leq 0.26$ when Y=0.60, and $0.50 \leq Y \leq 1.00$ when X=0.20.

6. The magneto-optical recording medium as set forth in claim 1, wherein said intermediate layer is selected from the group consisting of a GdFe alloy, a GdCo alloy, GdFeCo alloy, a GdDyFe alloy, a GdDyFeCo alloy, Fe, Co, and a FeCo alloy.

7. The magneto-optical recording medium as set forth in claim 3, wherein the magnetization direction of said second recording magnetic domain is reversed in accordance with information to be recorded, and said first recording magnetic domain is located adjacent to said second recording magnetic domain and has a magnetization direction which always faces one direction.

8. The magneto-optical recording medium as set forth in claim 7, wherein said recording layer includes a track having said first recording magnetic domain and said second recording magnetic domain, and information is recorded on said track by a mark position method for recording information by changing a position of said second recording magnetic domain as a recording bit.

9. The magneto-optical recording medium as set forth in claim 7, wherein said recording layer includes a track having said first recording magnetic domain and said second recording magnetic domain, and information is recorded on said track by a mark edge method for recording information by changing a length of said second recording magnetic domain as a recording bit having a width smaller than a track width.

10. A method for reading information from a magneto-optical recording medium, comprising the steps of:

preparing a magneto-optical recording medium which comprises:

a recording layer composed of a film with perpendicular magnetization, including a recording magnetic domain in which information is recorded by the perpendicular magnetization;

a readout layer composed of a film with perpendicular magnetization on said recording layer, including a readout magnetic domain to which the magnetization direction in said recording magnetic domain is copied, wherein a width of a stable magnetic domain capable of being exist stably in said readout magnetic domain is larger than a width of said recording magnetic domain at room temperature and becomes equal to or smaller than a width of said recording magnetic domain at an elevated predetermined temperature above room temperature; and an intermediate layer composed of a film with in-plane magnetization, said intermediate layer being arranged between said recording layer and said readout layer for controlling a magnetic exchange coupling force acting between said recording layer and said readout layer to be small so that, in a portion which is not irradiated with laser light for detecting the magnetization direction of said readout magnetic domain, the magnetization direction of said readout magnetic domain is not copied;

aligning directions of perpendicular magnetization in said readout layer in one direction beforehand by an external magnetic field;

projecting laser light onto said readout layer whose perpendicular magnetization has been aligned in one direction by said external magnetic field so as to raise a temperature of said readout layer until a stable magnetic domain width of said readout magnetic domain becomes equal to or smaller than a width of said recording magnetic domain, copying a magnetization direction in said recording magnetic domain to said readout magnetic domain whose temperature has been raised to a point where the stable magnetic domain width in said readout magnetic domain is equal to or smaller than the width of said recording magnetic domain by the laser light; and detecting a readout signal for reading information from said readout magnetic domain by the laser light.

11. The method as set forth in claim 10, wherein when aligning the perpendicular magnetization direction in said readout layer in one direction beforehand, an external magnetic field is applied to a surface of said magneto-optical recording medium, opposite to a surface whereon laser light is projected, and the magnetization direction in other readout magnetic domain which is different from said readout magnetic domain to which the magnetization direction is copied from said recording magnetic domain in response to a temperature rise caused by the laser light, is aligned in one direction by said external magnetic field.

12. The method as set forth in claim 10, wherein when aligning the perpendicular magnetization direction in said readout layer in one direction beforehand, a leakage magnetic flux generated by said recording layer is used as the external magnetic field.

13. The method as set forth in claim 10, wherein when raising the temperature of said readout layer, an intensity of said laser light is set so that the stable magnetic domain width is smaller than the width of said recording magnetic domain only in one readout magnetic domain.

14. The method as set forth in claim 10, further including the step of aligning the perpendicular magnetization direction in said readout layer in said one direction by the external magnetic field after detecting the readout signal from said readout magnetic domain.

15. The method as set forth in claim 14, wherein aligning the perpendicular magnetization direction in said readout layer in one direction after detecting the readout signal is performed using a leakage magnetic flux generated by said recording layer as the external magnetic field.

16. The method as set forth in claim 10, further comprising the step of differentiating the readout signal detected from said readout magnetic domain.

17. The method as set forth in claim 16, further comprising the step of detecting a position of said recording magnetic domain based on a fixed voltage level as a slice level with respect to the differentiated readout signal.

* * * * *